(12) United States Patent
Tanaka et al.

(10) Patent No.: US 7,088,513 B2
(45) Date of Patent: Aug. 8, 2006

(54) DIFFRACTION ELEMENT, OPTICAL HEAD DEVICE INCLUDING THE DIFFRACTION ELEMENT, OPTICAL INFORMATION APPARATUS INCLUDING THE OPTICAL HEAD DEVICE, SYSTEM INCLUDING THE OPTICAL INFORMATION APPARATUS AND METHOD OF DESIGNING DIFFRACTION GRATING OF THE DIFFRACTION ELEMENT

(75) Inventors: Toshiyasu Tanaka, Osaka (JP); Yoshiaki Komma, Hirakata (JP); Kousei Sano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 29 days.

(21) Appl. No.: 10/823,673

(22) Filed: Apr. 14, 2004

(65) Prior Publication Data

US 2004/0233533 A1 Nov. 25, 2004

(30) Foreign Application Priority Data

Apr. 15, 2003 (JP) ............................ P2003-110098

(51) Int. Cl.
*G02B 5/18* (2006.01)
(52) U.S. Cl. .................. 359/569; 359/566; 369/112.03
(58) Field of Classification Search ................ 359/566, 359/569; 369/112.03–112.07, 112.12
See application file for complete search history.

(56) References Cited

U.S. PATENT DOCUMENTS

2005/0141391 A1\* 6/2005 Ueyama et al. .......... 369/112.1
2005/0163018 A1\* 7/2005 Yukawa ................. 369/112.05

FOREIGN PATENT DOCUMENTS

| JP | 2001-281432 | * 10/2001 |
| JP | 2002-245660 | 8/2002 |
| JP | 2002-311219 | 10/2002 |

\* cited by examiner

*Primary Examiner*—Leonidas Boutsikaris
(74) *Attorney, Agent, or Firm*—Wenderoth, Lind & Ponack, L.L.P.

(57) ABSTRACT

A diffraction element includes a light-transmittable member and a diffraction grating formed on at least one face of the light-transmittable member. When a first laser beam having a first wavelength $\lambda 1$ and a second laser beam having a second wavelength $\lambda 2$ are transmitted through the diffraction element at first and second diffraction efficiencies, respectively, the diffraction element functions to equalize the first and second diffraction efficiencies to each other by only the one face of the diffraction element. The diffraction grating has a first phase modulation amount ø1 for the first laser beam and a second phase modulation amount ø2 for the second laser beam and the first and second phase modulation amounts ø1 and ø2 are, respectively, approximate to $(2\pi N1 \pm \Delta \emptyset)$ and $(2\pi N2 \pm \Delta \emptyset)$ in which "N1" and "N2" are natural numbers and "$\Delta \emptyset$" is a phase variation amount.

26 Claims, 12 Drawing Sheets

DIFFRACTION ELEMENT, OPTICAL HEAD DEVICE INCLUDING THE DIFFRACTION ELEMENT, OPTICAL INFORMATION APPARATUS INCLUDING THE OPTICAL HEAD DEVICE, SYSTEM INCLUDING THE OPTICAL INFORMATION APPARATUS AND METHOD OF DESIGNING DIFFRACTION GRATING OF THE DIFFRACTION ELEMENT

BACKGROUND OF THE INVENTION

1. Field of the Invention

The present invention relates to a two-wavelength diffraction element in which diffraction efficiency can be adjusted arbitrarily, a method of designing a diffraction grating of the diffraction element, an optical head device for recording, reproducing or erasing information on an optical information medium such as an optical disc by using the diffraction element and an optical information apparatus including the optical head device, as well as a computer, an optical information medium player, a car navigation system, an optical information medium recorder and an optical disc server each of which includes the optical information apparatus.

2. Description of the Prior Art

At present, various kinds of recording mediums are available for recording and storing digital audio, images and moving pictures as well as document files and data files produced by computers or the like. An optical disc is used as one of the recording mediums. Especially, digital versatile disks (DVDs) which have higher density and larger capacity than conventional compact discs (CDs) and are coming into wide use also in the field of recorders in place of video tape recorders (VTRs) used predominantly currently. Furthermore, the study of a next-generation optical disc having a higher recording density is being conducted in a number of firms and is expected to appear on the market in the near future.

In order to raise recording density of the optical disc, it is considered that a numerical aperture (NA) of a beam incident upon its information recording face is increased. However, if its optical axis tilts at this time, such a problem as an increase in the amount of aberration arises. In order to solve this problem, it is effective to reduce a thickness of a protective layer or a substrate thickness in the optical disc. In this specification, the "substrate thickness" indicates a thickness from an incident face of the beam to the information recording face in the optical disc.

Referring to the history of the optical disc, the first-generation optical disc is the CD in which an infrared beam having a wavelength of 780 to 820 nm is used as a light source, an objective lens has a numerical aperture of 0.45 and the thickness of the substrate is 1.2 mm. The second-generation optical disc is the DVD in which a red beam having a wavelength of 630 to 680 nm is used as a light source, an objective lens has a numerical aperture of 0.6 and the thickness of the substrate is 0.6 mm. Meanwhile, the third-generation optical disc under development currently is an ultrahigh-density optical disc in which a blue beam having a wavelength of 380 to 420 nm is used as a light source, an objective lens has a numerical aperture of 0.85 and the thickness of the substrate is 0.1 mm.

As is seen from the above, the thickness of the substrate becomes thinner for raising recording density. A single optical information apparatus is expected to be capable of recording and reproducing optical discs having different substrate thicknesses and different recording densities in view of its economical aspect and its occupied space. To this end, it is necessary to provide an optical head device including a condensing optical system which is capable of condensing a beam up to its diffraction limit on the optical discs having the different substrate thicknesses.

Meanwhile, tracking control and focusing control are typically necessary for recording and reproducing the optical disc. In order to detect these control signals by a compact arrangement at low cost, it is advantageous to employ a diffraction grating in the optical head device. In case recording and reproduction should be performed by the single optical information apparatus in a system including two or more light sources having different wavelengths, it is desirable that the diffraction element has an identical diffraction efficiency for the respective wavelengths of the light sources.

An arrangement in which a ratio of a zero-order beam (main beam) to first-order diffraction beams (sub-beams) can be adjusted for a specific wavelength is disclosed in Japanese Patent Laid-Open Publication Nos. 2001-281432, 2002-311219 and 2002-245660 and is described with reference to FIG. 12. FIG. 12 shows a conventional diffraction element 200. A first diffraction grating 200a for diffracting a laser beam of a wavelength $\lambda 1$ is provided on one face of the conventional diffraction element 200, while a second diffraction grating 200b for diffracting a laser beam of a wavelength $\lambda 2$ is provided on the other face of the conventional diffraction element 200. Thus, the first diffraction grating 200a diffracts the laser beam of the wavelength $\lambda 1$ and transmits the laser beam of the wavelength $\lambda 2$ therethrough as one beam. On the other hand, the second diffraction grating 200b diffracts the laser beam of the wavelength $\lambda 2$ and transmits the laser beam of the wavelength $\lambda 1$ therethrough as one beam. Meanwhile, a depth of the first diffraction grating 200a depends on the laser beam of the wavelength $\lambda 2$ and a width of each of land portions and a width of each of groove portions of the first diffraction grating 200a are formed such that the ratio of the zero-order diffraction beam to the first-order diffraction beams of the laser beam of the wavelength $\lambda 1$ diffracted by the first diffraction grating 200a falls within a predetermined range. Likewise, a depth of the second diffraction grating 200b depends on the laser beam of the wavelength $\lambda 1$ and a width of each of land portions and a width of each of groove portions of the second diffraction grating 200b are formed such that the ratio of the zero-order diffraction beam to the first-order diffraction beams of the laser beam of the wavelength $\lambda 2$ diffracted by the second diffraction grating 200a falls within a predetermined range.

In the above conventional arrangement, the diffraction gratings are, respectively, provided on opposite faces of a light-transmittable substrate, which requires time-consuming and expensive operations.

Meanwhile, since optical loss on the face of the diffraction grating, through which the beam is transmitted totally, is not zero, optical loss of the diffraction element having the two diffraction gratings provided on the opposite faces, respectively becomes large accordingly.

Meanwhile, in the above prior art documents, an infrared beam having a wavelength of 785 to 790 nm for the CD and a red beam having a wavelength of 650 to 658 nm for the DVD are used as the two wavelengths. In the next-generation ultrahigh-density optical disc apparatus, since a blue beam having a wavelength of 380 to 420 nm is used, an element usable for the blue beam should be provided.

However, the above prior art documents do not disclose an arrangement including such an element.

SUMMARY OF THE INVENTION

Accordingly, an essential object of the present invention is to provide, with a view to eliminating the above-mentioned drawbacks of the prior art, a diffraction element in which a diffraction grating is formed on only one face of a light-transmittable substrate and is capable of arbitrarily adjusting a zero-order diffraction efficiency and a first-order diffraction efficiency for a red beam having a wavelength of 630 to 680 nm and a blue beam having a wavelength of 380 to 420 nm, as well as an optical head device and an optical information apparatus which are compact and inexpensive by using the diffraction element.

In order to accomplish this object of the present invention, a diffraction element according to the present invention includes a light-transmittable member. A diffraction grating is formed on at least one face of the light-transmittable member. When a first laser beam having a first wavelength $\lambda 1$ and a second laser beam having a second wavelength $\lambda 2$ are transmitted through the diffraction element, the first and second laser beams are turned into first and second diffracted beams having first and second diffraction efficiencies, respectively. The diffraction element functions to equalize the first and second diffraction efficiencies to each other by only the one face of the diffraction element. The diffraction grating has a first phase modulation amount ø1 for the first laser beam and a second phase modulation amount ø2 for the second laser beam and the first and second phase modulation amounts ø1 and ø2 are, respectively, approximately expressed by the following equations (1) and (2):

$$ø1 = 2\pi N1 \pm \Delta ø \quad (1)$$

$$ø2 = 2\pi N2 \pm \Delta ø \quad (2)$$

in which "N1" and "N2" are natural numbers and "$\Delta ø$" is a phase variation amount.

Meanwhile, an optical head device according to the present invention includes a first laser beam source for emitting a blue laser beam having a first wavelength $\lambda 1$, a second laser beam source for emitting a red laser beam having a second wavelength $\lambda 2$, an optical lens for condensing at a minute spot on an information recording face of an optical information medium the blue laser beam or the red laser beam and a photodetector for outputting, in response to the blue laser beam or the red laser beam reflected on the information recording face of the optical information medium, an electric signal corresponding to a quantity of the blue laser beam or the red laser beam. The optical head device further includes the diffraction element referred to above. The diffraction element generates a diffracted beam from the blue laser beam or the red laser beam and the photodetector receives the refracted beam so as to detect a servo signal.

Furthermore, an optical information apparatus according to the present invention includes the optical head device referred to above. The optical information apparatus further includes a motor for rotating the optical information medium and an electric circuit for controlling and driving, on the basis of a signal received from the optical head device, the motor or one of the optical lens, the first laser beam source and the second laser beam source of the optical head device.

BRIEF DESCRIPTION OF THE DRAWINGS

This object and features of the present invention will become apparent from the following description taken in conjunction with the preferred embodiments thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Hereinafter, embodiments of the present invention are described with reference to the drawings.

FIRST EMBODIMENT

Figure 1:
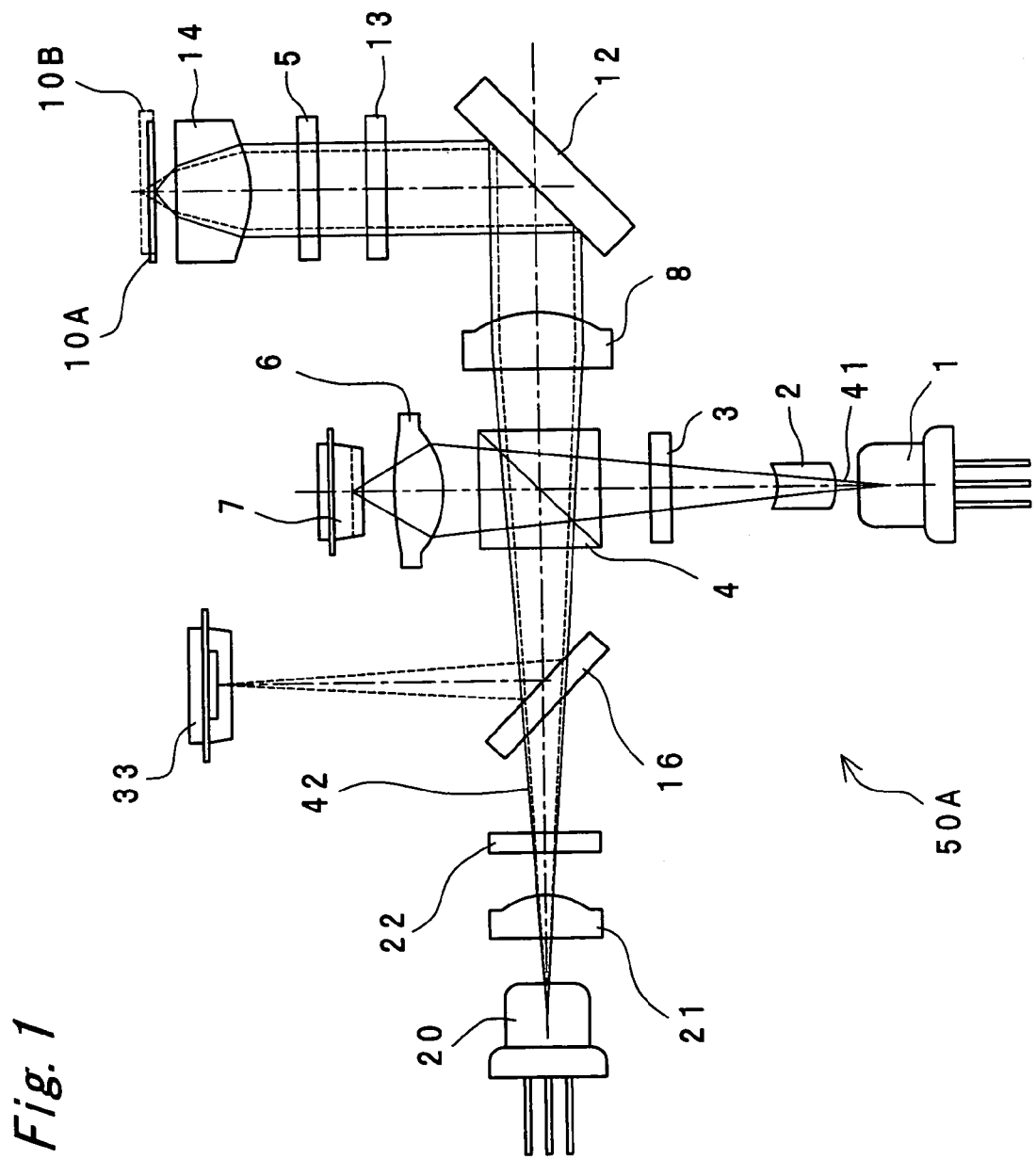
FIG. 1 is a schematic sectional view of an optical head device according to a first embodiment of the present invention.

FIG. 1 shows a structure of an optical head device 50A according to a first embodiment of the present invention. The optical head device 50A includes a blue laser 1 for emitting a blue laser beam 41 having a wavelength $\lambda 1$ of 380 to 420 nm, typically 405 nm, a red laser 20 for emitting a red laser beam 42 having a wavelength $\lambda 2$ of 630 to 680 nm, typically 660 nm, a beam splitter 4, a collimator lens 8, a rising mirror 12 for bending an optical axis, a hologram 13 acting as a diffraction element, a quarter-wave plate 5, a refraction type objective lens 14, a beam splitter 16 and a photodetector 33.

Figure 2:
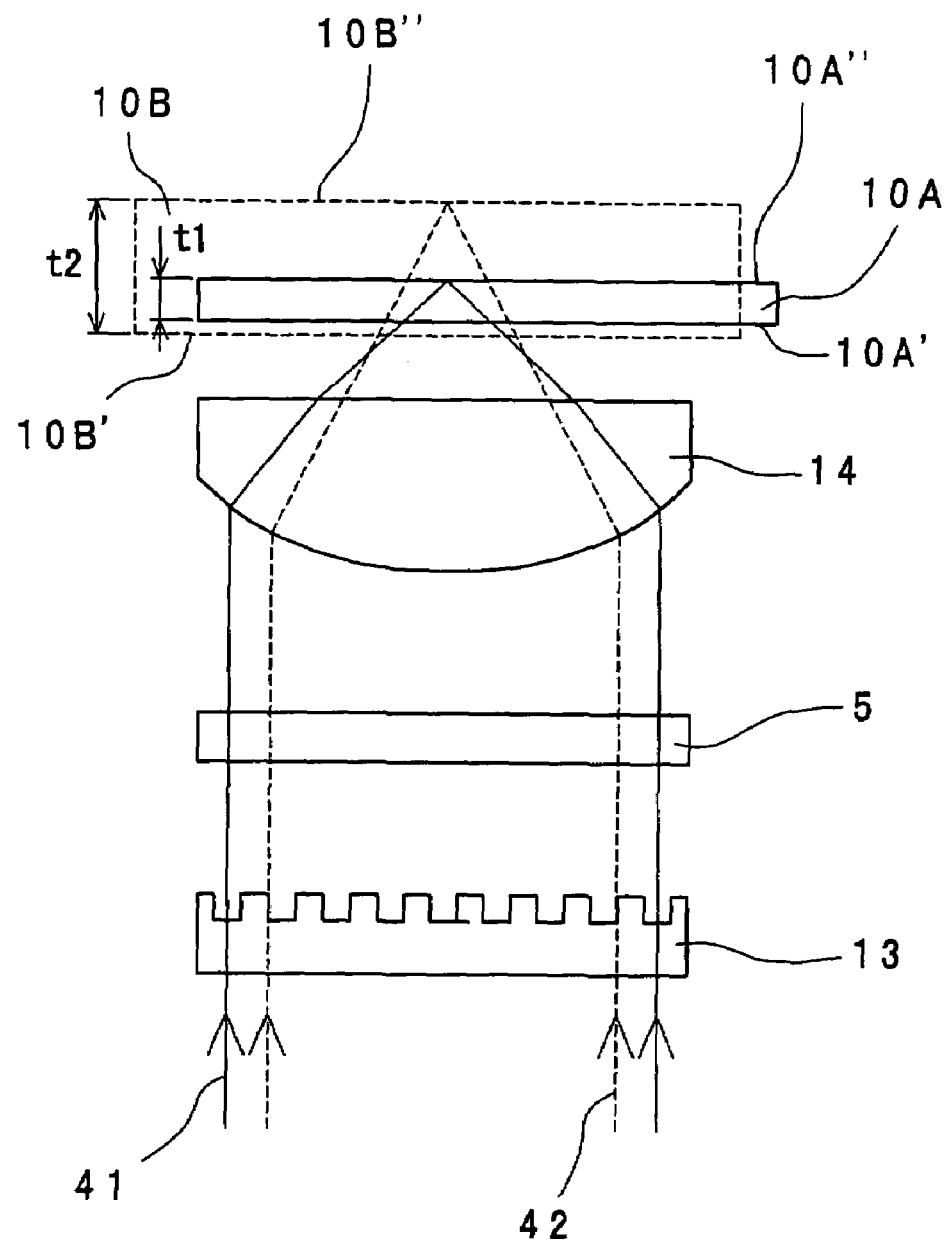
FIG. 2 is a fragmentary schematic sectional view of the optical head device of FIG. 1.

The optical head device 50A is usable for optical discs 10A and 10B. The optical disc 10A is a third-generation optical disc which has a substrate thickness t1 (FIG. 2) of 0.06 to 0.11 mm, for example, about 0.1 mm and is recorded and reproduced by the blue laser beam 41 having the wavelength $\lambda 1$. On the other hand, the optical disc 10B is a second-generation optical disc such as a DVD, which has a substrate thickness t2 (FIG. 2) of 0.54 to 0.65 mm, for example, about 0.6 mm and is recorded and reproduced by the red laser beam 42 having the wavelength $\lambda 2$. In the drawings, especially as best shown in FIG. 2, only a substrate having the thickness t1 from an incident face 10A' to an information recording face 10A" is depicted as the optical disc 10A, while only a substrate having the thickness t2 from an incident face 10B' to an information recording face 10B" is depicted as the optical disc 10B. Actually, in the optical discs 10A and 10B, a protective layer is bonded to the information recording face 10A" or 10B" of the substrate so as to add a mechanical strength to the substrate and set an overall thickness of the optical disc to 1.2 mm equal to that of a CD. Thus, the protective layer has a thickness of 1.1 mm in the optical disc 10A and a thickness of 0.6 mm in the optical disc 10B. However, in the drawings, the protective layer is not depicted for illustrational simplification.

If each of the blue laser 1 and the red laser 20 is preferably formed by a semiconductor laser, the optical head device 50A and an optical information apparatus employing the optical head device 50A can be made compact in size, light in weight and low in power consumption.

In case recording and reproduction are performed on the optical disc 10A having the highest recording density, the blue laser beam 41 having the wavelength $\lambda 1$ is emitted as a linearly polarized beam from the blue laser 1 and is reflected by the beam splitter 4. Then, the blue laser beam 41 is turned into a substantially parallel beam by the collimator lens 8 and an optical axis of the blue laser beam 41 is bent by the rising mirror 12. Subsequently, the blue laser beam 41 is transmitted through the hologram 13 and is turned into a circularly polarized beam by the quarter-wave plate 5. The quarter-wave plate 5 is designed to function as a quarter-wave plate for both the wavelengths $\lambda 1$ and $\lambda 2$. Thereafter, the blue laser beam 41 is condensed, via the substrate of the optical disc 10A having the substrate thickness of 0.1 mm, by the objective lens 14 to the information recording face 10A" of the substrate of the optical disc 10A.

The blue laser beam 41 reflected on the information recording face 10A" of the optical disc 10A traces the forward optical path reversely as a return optical path and is turned by the quarter-wave plate 5 into a linearly polarized beam orthogonal to that of the forward optical path. Then, the blue laser beam 41 is diffracted by the hologram 13 and is transmitted through the beam splitter 4 substantially totally. Subsequently, the blue laser beam 41 is totally reflected by the beam splitter 16 so as to be incident upon the photodetector 33. By calculating an output of the photodetector 33, a servo signal used for focusing control and tracking control of the optical disc 10A and an information signal are obtained. For the blue laser beam 41 having the wavelength $\lambda 1$, the beam splitter 4 has a polarization separating film for totally reflecting, in the forward optical path, the linearly polarized beam oriented in one direction but totally transmitting, in the return optical path, the linearly polarized beam orthogonal to the one direction as described above. As described later, the red laser beam 42 having the wavelength $\lambda 2$ and emitted by the red laser 20 is totally transmitted through the beam splitter 4. Thus, the beam splitter 4 is an optical path splitting element having polarization characteristics and wavelength selectivity.

On the other hand, in case recording and reproduction are performed on the optical disc 10B, the red laser beam 42 having the wavelength $\lambda 2$ is emitted as a substantially linearly polarized beam from the red laser 20 and is transmitted through the beam splitter 16 and the beam splitter 4. Then, the red laser beam 42 is turned into a substantially parallel beam by the collimator lens 8 and an optical axis of the red laser beam 42 is bent by the rising mirror 12. Subsequently, the red laser beam 42 is transmitted through the hologram 13 and is turned into a circularly polarized beam by the quarter-wave plate 5. Thereafter, the blue laser beam 42 is condensed, by way of the substrate of the optical disc 10B having the substrate thickness of 0.6 mm, by the objective lens 14 to the information recording face 10B" of the substrate of the optical disc 10B.

The red laser beam 42 reflected on the information recording face 10B" of the optical disc 10B traces the forward optical path reversely as a return optical path and is turned by the quarter-wave plate 5 into a linearly polarized beam orthogonal to that of the forward optical path. Then, the red laser beam 42 is diffracted by the hologram 13 and is transmitted through the beam splitter 4 substantially totally. Subsequently, the blue laser beam 42 is totally reflected by the beam splitter 16 so as to be incident upon the photodetector 33. By calculating an output of the photodetector 33, a servo signal used for focusing control and tracking control of the optical disc 10B and an information signal are obtained. In order to obtain the servo signals of the optical discs 10A and 10B from the single photodetector 33, light emitting points of the blue laser 1 and the red laser 20 are disposed relative to the objective lens 14 located at the common position so as to form images on the optical discs 10A and 10B, respectively. As a result, it becomes possible to reduce the number of photodetectors and the number of wires necessary for the photodetectors.

For the red laser beam 42 having the wavelength $\lambda 2$, the beam splitter 16 is a polarization separating film for totally transmitting, in the forward optical path, the linearly polarized beam oriented in one direction but totally reflecting, in the return optical path, the linearly polarized beam orthogonal to the one direction. In addition, the beam splitter 16 totally reflects the blue laser beam 41 having the wavelength $\lambda 1$. Thus, the beam splitter 16 is also an optical path splitting element having polarization characteristics and wavelength selectivity.

A function and an arrangement of the hologram 13 are described below with reference to FIGS. 2 to 4. In FIG. 2, the hologram 13 has polarization anisotropy in which a linearly polarized beam oriented in one direction is totally transmitted without being diffracted but a linearly polarized beam orthogonal to the one direction is diffracted. In this case, the linearly polarized beam in the forward optical path of each of the blue laser beam 41 having the wavelength $\lambda 1$ and the red laser beam 42 having the wavelength $\lambda 2$ is adapted to be totally transmitted through the hologram 13. In the forward optical path of each of the blue laser beam 41 and the red laser beam 42, the linearly polarized beam oriented in one direction is turned into the circularly polarized beam by the quarter-wave plate 5 and the circularly polarized beam is condensed by the objective lens 14 so as to be reflected by each of the optical discs 10A and 10B. Then, when the circularly polarized beam is transmitted through the quarter-wave plate 5 again, the circularly polarized beam is turned into the linearly polarized beam orthogonal to the one direction. Since the hologram 13 is a polarization diffraction element, each of the blue laser beam 41 and the red laser beam 42 is diffracted by the hologram 13 in the return optical path such that a zero-order diffraction beam acting as a main beam and ± first-order diffraction beams acting as sub-beams for obtaining the servo signal are generated.

Figure 3:
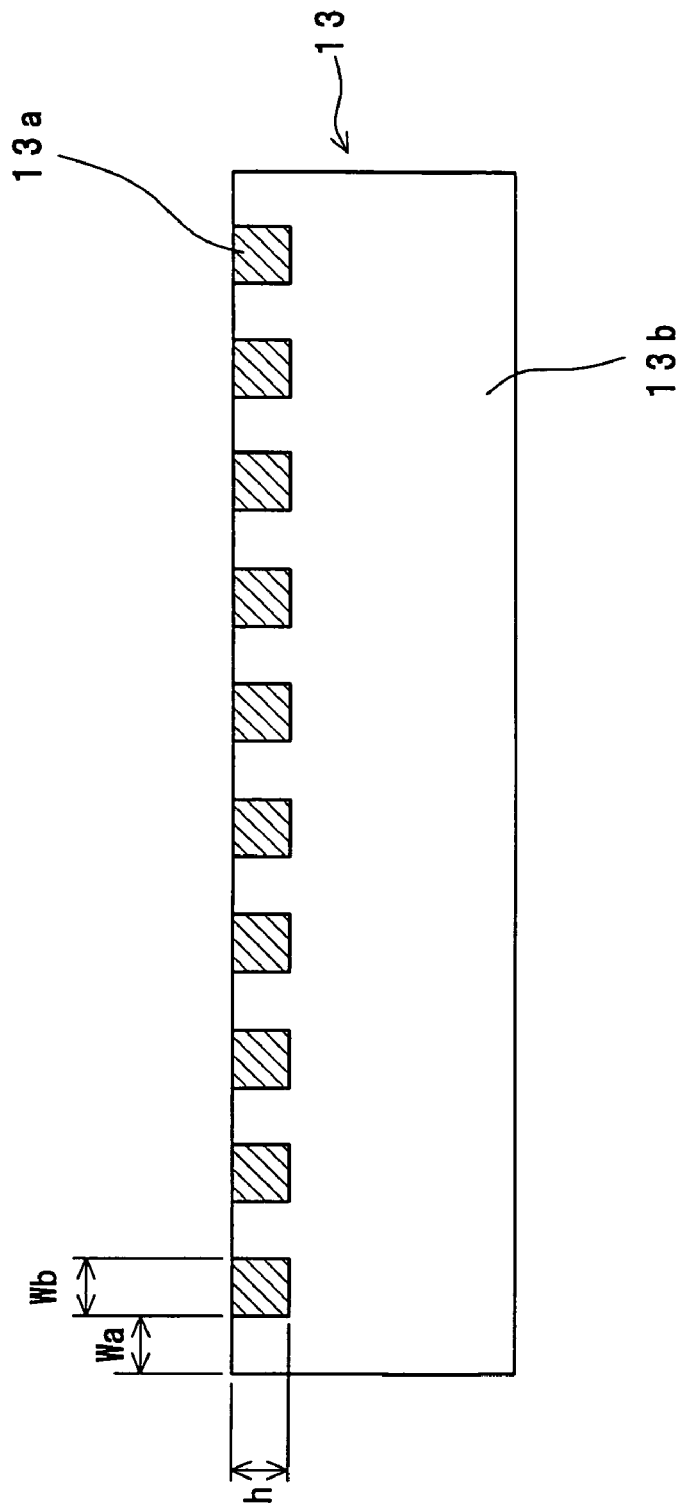
FIG. 3 is an enlarged sectional view of a hologram employed in the optical head device of FIG. 1.

FIG. 3 is a detail view of the hologram 13. A plurality of methods of producing a hologram having polarization anisotropy are known. As one example of such hologram, the hologram 13 of FIG. 3 has such an arrangement as liquid crystal, in which material 13a having polarization anisotropy is embedded in material 13b having no polarization anisotropy. The hologram having polarization anisotropy may also be obtained by proton exchange of lithium niobate. In FIG. 3, the hologram 13 can be regarded as a diffraction element in which land portions each having a width Wa and groove portions each having a width Wb and a depth h are arranged alternately as a rectangular diffraction grating.

Figure 4A:
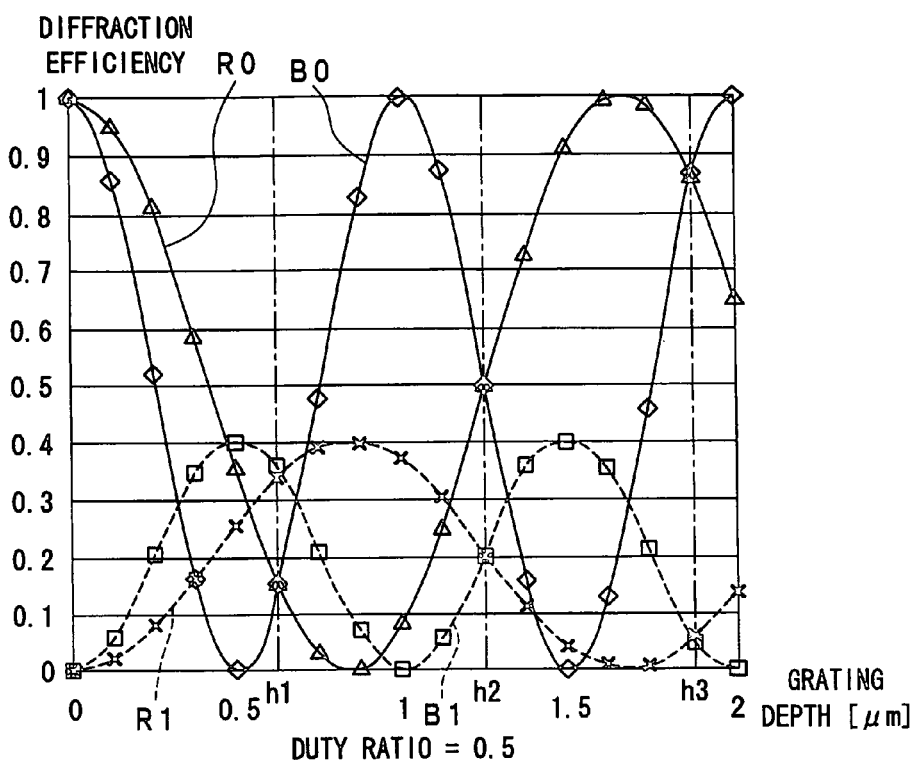
FIGS. 4A and 4B are graphs showing relation between grating depth and diffraction efficiency for duty ratios of 0.5 and 0.2, respectively, in the hologram of FIG. 3.
Figure 4B:
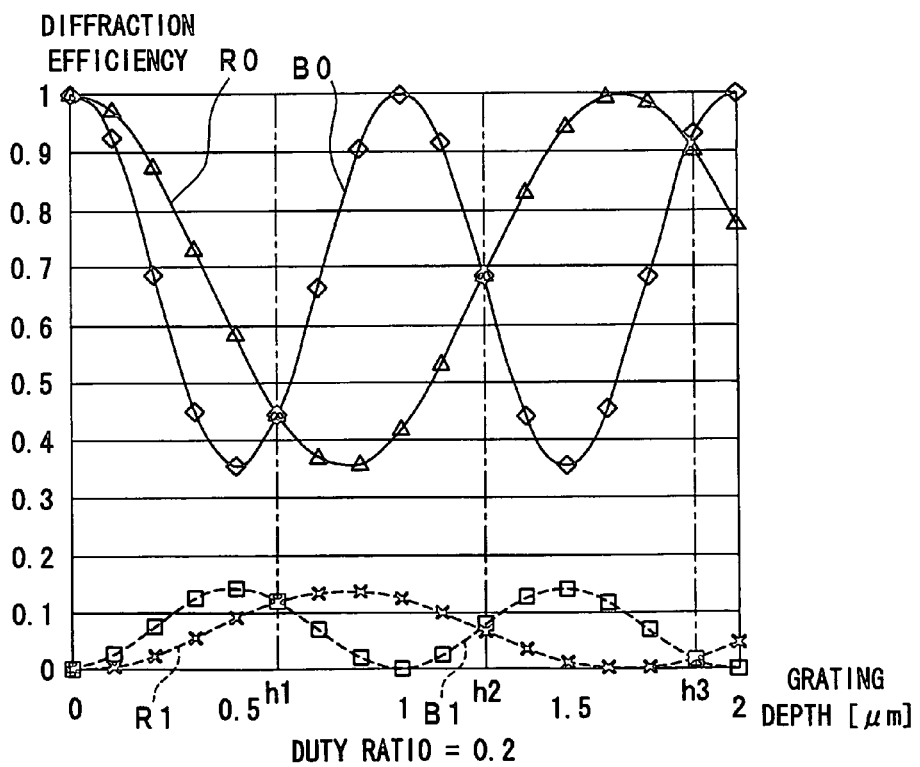

Supposing that a duty ratio is defined as {Wa/(Wa+Wb)}, FIGS. 4A and 4B are graphs showing zero-order diffraction efficiency and first-order diffraction efficiency obtained for the blue laser beam 41 and the red laser beam 42 by scalar calculation at the time the duty ratio is 0.5 and 0.2, respectively. In FIGS. 4A and 4B, the abscissa axis represents the grating depth h (FIG. 3) in μm and the ordinate axis represents diffraction efficiency. In FIGS. 4A and 4B, curves "B0" and "B1" denote a zero-order diffraction efficiency and a first-order diffraction efficiency of the blue laser beam 41, respectively, while curves "R0" and "R1" denote a zero-order diffraction efficiency and a first-order diffraction efficiency of the red laser beam 42, respectively. It will be seen from FIGS. 4A and 4B that even the diffraction grating formed on only one face of the diffraction element 13 is capable of adjusting, by using the grating depth h and the duty ratio, the zero-order diffraction efficiency and the first-order diffraction efficiency for the blue laser beam 41 and the red laser beam 42, which have the different wavelengths $\lambda 1$ and $\lambda 2$, respectively.

Furthermore, supposing here that "N1" and "N2" denote natural numbers and "$\Delta \varnothing$" denotes a phase variation amount, the diffraction grating is designed such that a phase modulation amount $\varnothing 1$ of the blue laser beam 41 having the wavelength $\lambda 1$ and a phase modulation amount $\varnothing 2$ of the blue laser beam 42 having the wavelength $\lambda 2$ are, respectively, expressed by the following equations (1) and (2).

$$\varnothing 1 = 2\pi N1 \pm \Delta\varnothing \quad (1)$$

$$\varnothing 2 = 2\pi N2 \pm \Delta\varnothing \quad (2)$$

More specifically, when the linearly polarized beam in the return optical path is incident upon the hologram 13 from the material 13a having polarization anisotropy, the grating depth h is approximately expressed by the following equation (3):

$$h = [N\lambda 1 \lambda 2 / \{\lambda 1(n2-1) + \lambda 2(n1-1)\}] \quad (3)$$

in which "n1" denotes a refractive index of the hologram 13 for the blue laser beam 41 having the wavelength $\lambda 1$, "n2" denotes a refractive index of the hologram 13 for the blue laser beam 42 having the wavelength $\lambda 2$ and "N" denotes a natural number.

When the natural number N is equal to 1, 2 and 3, the grating depth h is set to h1, h2 and h3, respectively, as shown in FIGS. 4A and 4B. Thus, the grating depths h1, h2 and h3 are, respectively, expressed by the following equations (4), (5) and (6).

$$h1 = [\lambda 1 \lambda 2 / \{\lambda 1(n2-1) + \lambda 2(n1-1)\}] \quad (4)$$

$$h2 = [2\lambda 1 \lambda 2 / \{\lambda 1(n2-1) + \lambda 2(n1-1)\}] \quad (5)$$

$$h3 = [3\lambda 1 \lambda 2 / \{\lambda 1(n2-1) + \lambda 2(n1-1)\}] \quad (6)$$

It is apparent from FIG. 4A for the duty ratio of 0.5 that the zero-order diffraction efficiency of the blue laser beam 41 and that of the red laser beam 42 are equal to each other at the grating depths h1, h2 and h3, while the first-order diffraction efficiency of the blue laser beam 41 and that of the red laser beam 42 are equal to each other at the grating depths h1, h2 and h3. Likewise, it is also apparent from FIG. 4B for the duty ratio of 0.2 that the zero-order diffraction efficiency of the blue laser beam 41 and that of the red laser beam 42 are equal to each other at the grating depths h1, h2 and h3, while the first-order diffraction efficiency of the blue laser beam 41 and that of the red laser beam 42 are equal to each other at the grating depths h1, h2 and h3. Namely, the identical zero-order diffraction efficiency and the identical first-order diffraction efficiency can be obtained for the blue laser beam 41 and the red laser beam 42 by the single diffraction element 13.

Since the laser beam is diffracted by the diffraction grating formed on the one face of the diffraction element 13, optical utilization efficiency becomes higher than that of a diffraction element having two diffraction gratings formed on its opposite faces, respectively. Accordingly, such effects are gained that service life of the laser can be lengthened and power consumption can be reduced.

Referring back to the optical head device 50A of FIG. 1, the hologram 13 is a diffraction element for obtaining the servo signal. In the diffraction element 13, it is desirable that diffraction efficiency of the diffraction grating for obtaining the zero-order diffraction beam which is condensed and used for generation of a radio frequency (RF) signal, i.e., the main beam is comparatively high and diffraction efficiency of the diffraction grating for obtaining the first-order diffraction beam which is subjected to wave front conversion and is utilized for servo detection, i.e., the sub-beam is comparatively low. In the optical head device 50A, since the single photodetector 33 is provided for signal detection as shown in FIG. 1, the number of components is reduced desirably. When the photodetector 33 is used for both the wavelength $\lambda 1$ and the wavelength $\lambda 2$ as described above, it is desirable that the zero-order diffraction efficiency of the blue laser beam 41 and that of the red laser beam 42 are equal to each other and the first-order diffraction efficiency of the blue laser beam 41 and that of the red laser beam 42 are equal to each other. Experiments conducted by the present inventors have revealed that when a ratio of the zero-order diffraction efficiency to the first-order diffraction efficiency is 10/1, not only the RF signal has an excellent signal-to-noise ratio (SNR) but the servo signal is stable. Therefore, in FIG. 4A for the duty ratio of 0.5, the grating depth h3 is most desirable. However, at this time, the grating depth h3 is about three times the wavelengths $\lambda 1$ and $\lambda 2$ of the blue laser beam 41 and the red laser beam 42 applied to the hologram 13. Therefore, both the zero-order diffraction efficiency and the first-order diffraction efficiency decrease from the scalar calculation. On the other hand, in FIG. 4B for the duty ratio of 0.2, the grating depth h2 can be employed sufficiently and the diffraction efficiency approximate to the scalar calculation can be employed.

In the foregoing, the duty ratios of 0.5 and 0.2 have been described with reference to FIGS. 4A and 4B, respectively. However, in order to obtain proper diffraction efficiency, the duty ratio and the grating depth h are not limited to the above values. More specifically, if the grating depth h1 at the time of (N=1) is employed, the zero-order diffraction efficiency and the first-order diffraction efficiency based on scalar calculation are about 60% and about 6%, respectively, when the duty ratio is 0.135.

Meanwhile, if the grating depth h2 at the time of (N=2) is employed, the zero-order diffraction efficiency and the first-order diffraction efficiency based on scalar calculation are about 70% and about 7%, respectively, when the duty ratio is 0.2 as shown in FIG. 4B.

On the other hand, if the grating depth h3 at the time of (N=3) is employed, the zero-order diffraction efficiency and the first-order diffraction efficiency based on scalar calculation are about 85% and about 6% when the duty ratio is 0.5 as shown in FIG. 4A.

As described above, it is desirable that the ratio of the zero-order diffraction efficiency to the first-order diffraction efficiency should actually range from about (7/1) to about (15/1) and may be, for example, about (10/1). It is considered that the ratio of the zero-order diffraction efficiency to the first-order diffraction efficiency should be not less than (7/1) from a standpoint of the optical utilization efficiency. However, if the ratio of the zero-order diffraction efficiency to the first-order diffraction efficiency exceeds (15/1), influence exerted by stray light cannot be neglected and thus, the signals become unstable. Thus, the ratio of the zero-order diffraction efficiency to the first-order diffraction efficiency should desirably fall within the above range of (7/1) to (15/1).

Additional devices which can be further provided in the optical head device 50A are described below. These additional devices are not restricted to the first embodiment but may be applied to all the embodiments. However, it is to be noted that an essential point of the present invention resides in that the diffraction grating is formed on only the one face of the diffraction element 13 so as to obtain the specific diffraction efficiencies for the blue laser beam 41 and the red laser beam 42. Firstly, in FIG. 1, a three-beam grating 3 acting as a diffraction element may be further provided between the blue laser 1 and the beam splitter 4 so as to detect a tracking error signal of the optical disc 10A by a well-known differential push-pull (DPP) method.

Secondly, supposing that two directions perpendicular to the optical axis are defined as an x-axis and a y-axis, a beam shaping element 2 for enlarging the blue laser beam 41 in, for example, only the x-axis may be further provided between the blue laser 1 and the beam splitter 4 so as to bring a far-field image of the blue laser beam 41 closer to an intensity distribution symmetrical with respect to the optical axis such that the optical utilization efficiency can be raised. The beam shaping element 2 may be formed by a double cylindrical lens or the like.

Thirdly, a three-beam grating 22 acting as a diffraction element may be further provided between the red laser 20 and the beam splitter 16 so as to detect a tracking error signal of the optical disc 10B by the well-known DPP method. In addition, a relay lens 21 may be further provided between the red laser 20 and the beam splitter 16 so as to change a numerical aperture for the purpose of correcting a far-field image and raising the optical utilization efficiency.

Fourthly, a condenser lens 6 and a photodetector 7 are further provided. Namely, the linearly polarized beam emitted from the blue laser 1 is partially (for example, about 10%) transmitted through the beam splitter 4 such that the transmitted beam is further guided to the photodetector 7 by the condenser lens 6. By using a signal obtained from the photodetector 7, change of quantity of the beam emitted by the blue laser 1 is monitored or is subjected to feedback such that quantity of the beam emitted by the blue laser 1 is kept constant.

Furthermore, the linearly polarized beam emitted from the red laser 20 is partially (for example, about 10%) reflected by the beam splitter 4 such that the reflected beam is further guided to the photodetector 7 by the condenser lens 6. By using a signal obtained from the photodetector 7, change of quantity of the beam emitted by the red laser 20 is monitored or is subjected to feedback such that quantity of the beam emitted by the red laser 20 is kept constant.

As will be seen from the above description of the first embodiment of the present invention, since both the blue laser beam 41 and the red laser beam 42 should pass through the hologram 13 in the forward optical path and the return optical path, the hologram 13 has polarization anisotropy by utilizing difference in the polarization directions of the linearly polarized beam in the forward optical path and the return optical path. By adjusting the grating depth h and the duty ratio of the hologram 13, the zero-order diffraction efficiency of the blue laser beam 41 and that of the red laser beam 42 can be adjusted so as to be substantially identical with each other, while the first-order diffraction efficiency of the blue laser beam 41 and that of the red laser beam 42 can be adjusted so as to be substantially identical with each other. Meanwhile, if the diffraction grating is formed so as to have the grating depth h close to that expressed by the equation (3), the identical zero-order diffraction efficiency can be obtained for the blue laser beam 41 and the red laser beam 42, while the identical first-order diffraction efficiency can be obtained for the blue laser beam 41 and the red laser beam 42.

Meanwhile, since the diffraction grating is formed on only the one face of the hologram 13, the hologram 13 can be produced at lower cost than a hologram having two diffraction gratings formed on its opposite faces, respectively.

Furthermore, since the diffraction grating is formed on only the one face of the hologram 13, optical loss of the beam totally transmitted through the hologram 13 can be reduced as compared with a hologram having two diffraction gratings formed on its opposite faces, respectively. As a result, since the optical utilization efficiency can be raised, output of the light source can be made low. In case the light source is formed by the semiconductor laser, service life of the light source can be lengthened and power consumption can be reduced.

Meanwhile, since the diffraction grating is formed on only the one face of the hologram 13, it is possible to gain such a degree of freedom in which another function may be imparted to the other face of the hologram 13 opposite to the one face having the diffraction grating, so that, for example, a grating for generating three beams as in the three-beam grating (diffraction grating) 22 may be formed on the other face of the hologram 13. As a result, since the single component 13 has plural functions by eliminating the three-beam grating 22, space is left at a location where the three-beam 22 has been provided, so that another component can be provided in the space or the optical system as a whole can be made smaller in size.

SECOND EMBODIMENT

Figure 5:
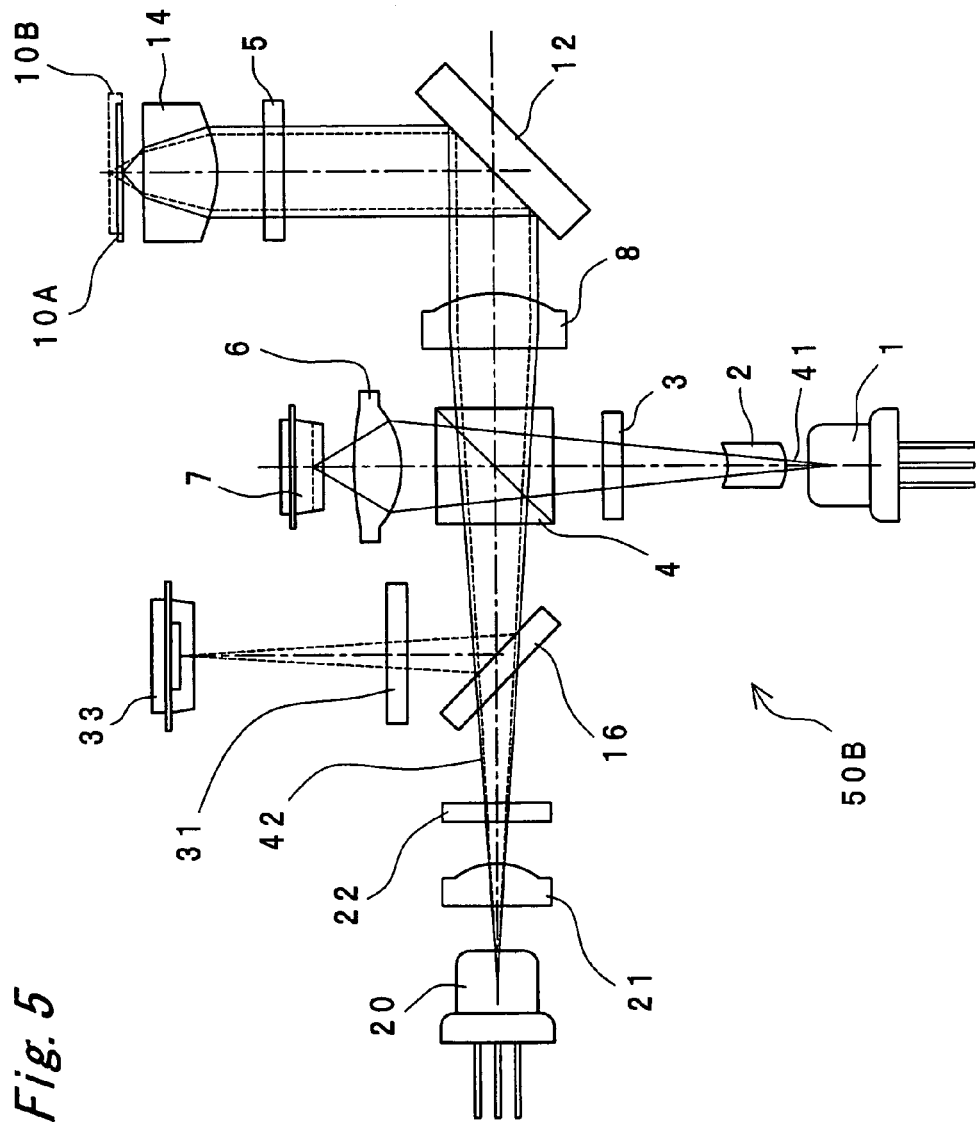
FIG. 5 is a schematic sectional view of an optical head device according to a second embodiment of the present invention.

FIG. 5 shows a structure of an optical head device 50B according to a second embodiment of the present invention. In FIG. 5, the hologram 13 of the optical head device 50A of the first embodiment is eliminated and a hologram 31 is instead provided between the beam splitter 16 and the photodetector 33. Since other structures of the optical head device 50B are similar to those of the optical head device 50A of the first embodiment, the description is abbreviated for the sake of brevity.

Figure 6:
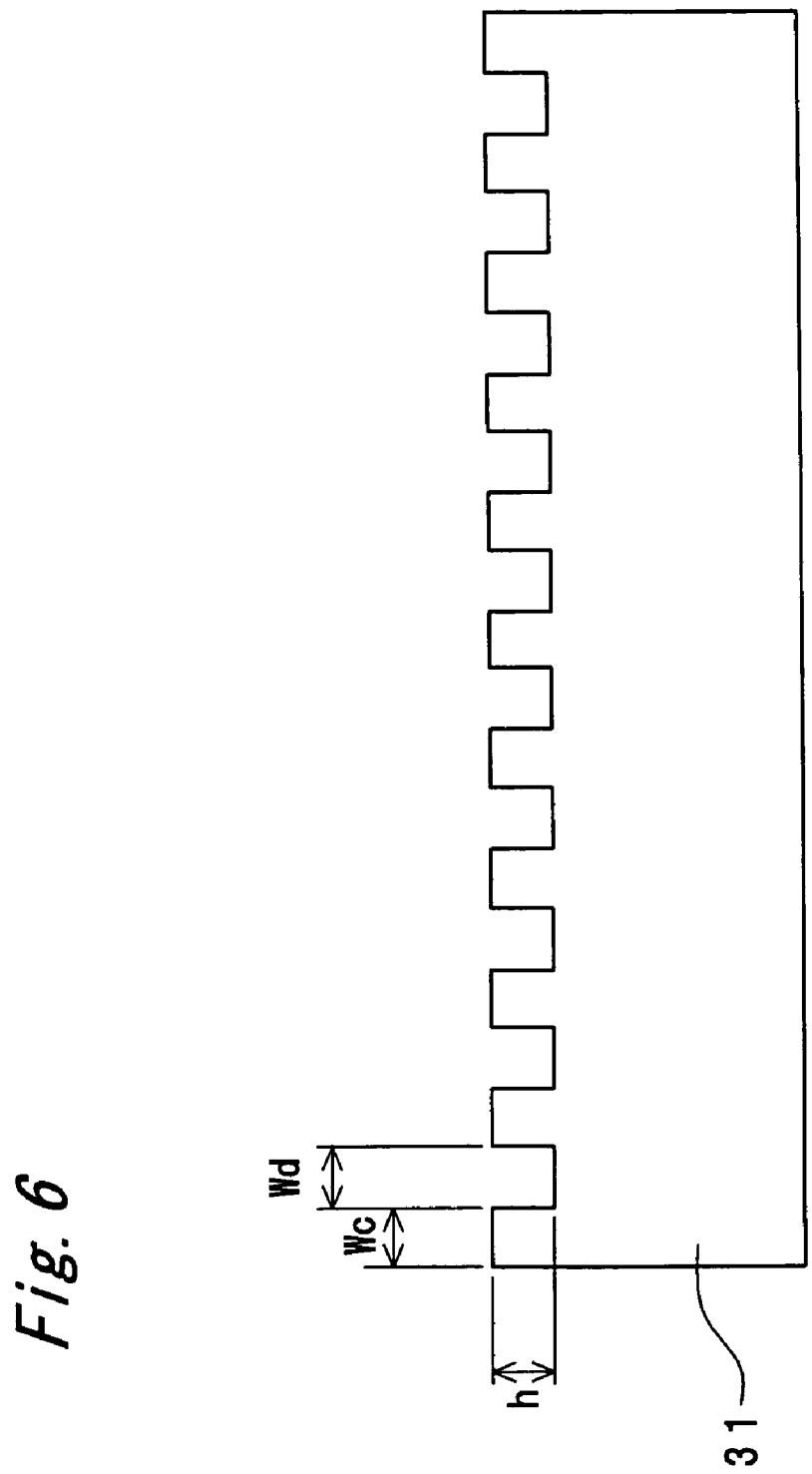
FIG. 6 is an enlarged sectional view of a hologram employed in the optical head device of FIG. 5.

A function and an arrangement of the hologram 31 are described below with reference to FIG. 6. The hologram 31 does not have polarization anisotropy in contrast with the hologram 13 of the first embodiment for the following reason. Namely, since the blue laser beam 41 or the red laser beam 42 passes through the hologram 31 only in one direction from the optical disc 10A or 10B towards the photodetector 33 in FIG. 5, it is not necessary to switch the hologram 31 to a nondiffractive mode or a diffractive mode on the basis of whether the linearly polarized beam is oriented in a direction or a direction orthogonal to the direction. Therefore, the hologram 31 may be formed by simple glass or resin and is a diffraction element in which land portions each having a width Wc and groove portions each having a width Wd and a depth h are arranged alternately as a rectangular diffraction grating. In the hologram 31, a duty ratio is defined as {Wc/(Wc+Wd)}.

Also in the second embodiment, since the hologram 31 is the diffraction element for obtaining the servo signal, it is desirable that the diffraction efficiency of the zero-order diffraction beam, i.e., the main beam, is comparatively high and the diffraction efficiency of the first-order diffraction beams, i.e., the sub-beams, is comparatively low. Namely, as described in the first embodiment, it is possible to obtain a proper diffraction efficiency of the blue laser beam 41 and the red laser beam 42 by adjusting the duty ratio and the grating depth h.

Supposing that "n21" denotes a refractive index of the hologram 31 for the blue laser beam 41 having the wavelength λ1, "n22" denotes a refractive index of the hologram 31 for the red laser beam 42 having the wavelength λ2 and "N" denotes a natural number, the grating depth h is approximately expressed by the following equation (7) in the same manner as the first embodiment.

$$h = [N\lambda1\lambda2/\{\lambda1(n22-1)+\lambda2(n21-1)\}] \quad (7)$$

Also in the second embodiment, since the grating depth h, the diffraction efficiency and the duty ratio satisfy the relations shown in FIGS. 4A and 4B in the same manner as the first embodiment, even the diffraction grating formed on only one face of the hologram 31 is capable of adjusting, by using the grating depth h and the duty ratio, to the identical zero-order diffraction efficiency and the identical first-order diffraction efficiency the blue laser beam 41 and the red laser beam 42, which have the different wavelengths λ1 and λ2, respectively.

When the natural number N is equal to 1, 2 and 3, the grating depth h is set to h1, h2 and h3, respectively, as described earlier. When the duty ratio is 0.135 at the grating depth h1, the zero-order diffraction efficiency and the first-order diffraction efficiency based on scalar calculation are about 60% and 6%, respectively. Meanwhile, when the duty ratio is 0.2 at the grating depth h2, the zero-order diffraction efficiency and the first-order diffraction efficiency based on scalar calculation are about 70% and 7%, respectively. Moreover, when the duty ratio is 0.5 at the grating depth h3, the zero-order diffraction efficiency and the first-order diffraction efficiency based on scalar calculation are about 85% and 6%, respectively.

As described above, it is desirable that the ratio of the zero-order diffraction efficiency to the first-order diffraction efficiency should actually range from about (7/1) to about (15/1) and may be, for example, about (10/1).

In addition, the additional devices which are further provided in the optical head device 50A of the first embodiment can also be further provided in the optical head device 50B.

In the second embodiment, since the hologram 31 is provided at a location different from that of the first embodiment, the hologram 31 may formed by general materials such as glass and resin without having polarization anisotropy. Also in this case, the diffraction grating may be formed on only the one face of the hologram 31. By designing the hologram 31 in the same manner as the hologram 13 of the first embodiment, the hologram 31 is capable of obtaining the identical zero-order diffraction efficiency and the identical first-order diffraction efficiency for the blue laser beam 41 and the red laser beam 42 and is capable of adjusting the zero-order diffraction efficiency and the first-order diffraction efficiency through adjustment of the duty ratio. Naturally, if the diffraction grating is formed so as to have the grating depth h close to that expressed by the equation (7), the identical zero-order diffraction efficiency can be obtained for the blue laser beam 41 and the red laser beam 42, while the identical first-order diffraction efficiency can be obtained for the blue laser beam 41 and the red laser beam 42.

Meanwhile, also in the second embodiment, since the diffraction grating may be formed on only the one face of the hologram 31, the above effects of the first embodiment, which are achieved by forming the diffraction grating on only the one face of the hologram 13, are wholly obtained.

THIRD EMBODIMENT

Figure 7:
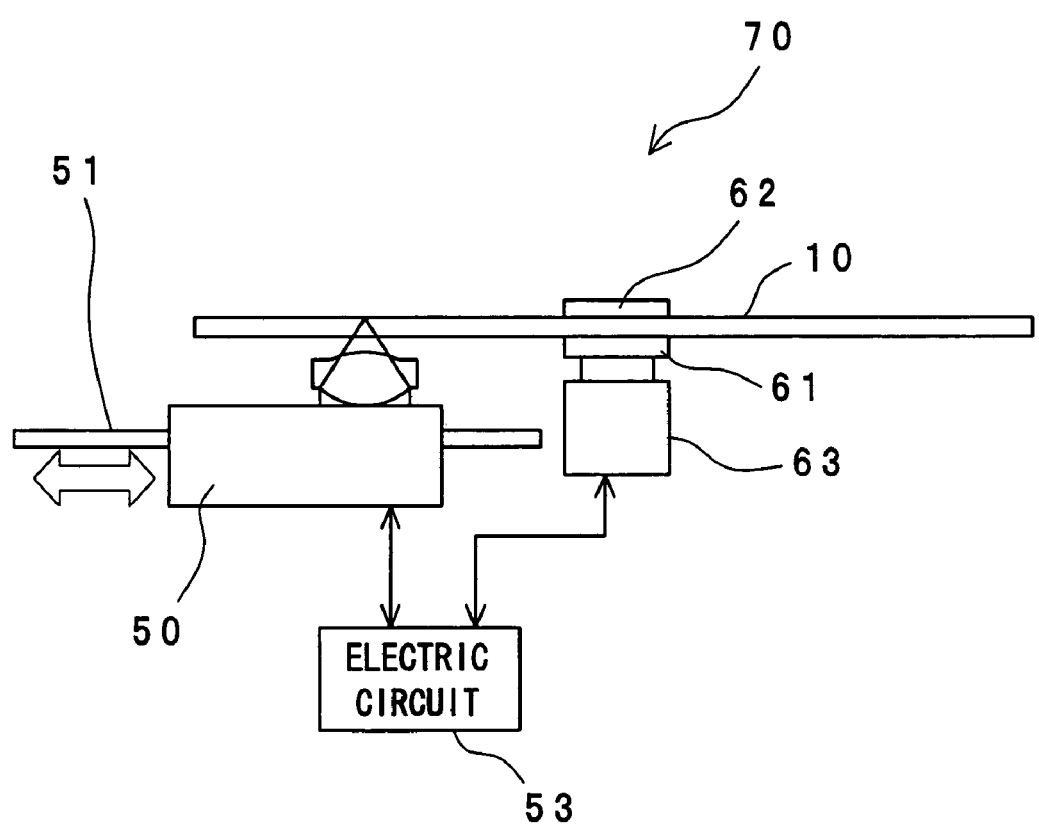
FIG. 7 is a schematic sectional view of an optical information apparatus according to a third embodiment of the present invention, which includes the optical head device of FIG. 1 or FIG. 5.

FIG. 7 shows an optical information apparatus 70 according to a third embodiment of the present invention, which includes an optical head device 50. The optical head device 50 is formed by the optical head device 50A of the first embodiment or the optical head device 50B of the second embodiment. In FIG. 7, an optical disc 10 formed by the above mentioned optical disc 10A or 10B is gripped between a turntable 61 and a clamper 62 so as to be rotated by a motor 63. The optical head device 50 is driven by a drive unit 51 to a track of the optical disc 10, which track stores desired information.

The optical head device 50 also delivers to an electric circuit 53 a focusing error signal and a tracking error signal corresponding to its position relative to the optical disc 10. In response to the focusing error signal and the tracking error signal, the electric circuit 53 issues to the optical head device 50 a signal for minutely displacing the objective lens 14. In accordance with this signal, the optical head device 50 performs focusing control and tracking control on the optical disc 10 so as to read, write or erase information on the optical disc 10.

In the optical information apparatus 70 of this embodiment, since the optical head device 50A of the first embodiment or the optical head device 50B of the second embodiment is used as the optical head device 50, a plurality of the optical discs having different recording densities can be used in the single optical head device 50.

FOURTH EMBODIMENT

Figure 8:
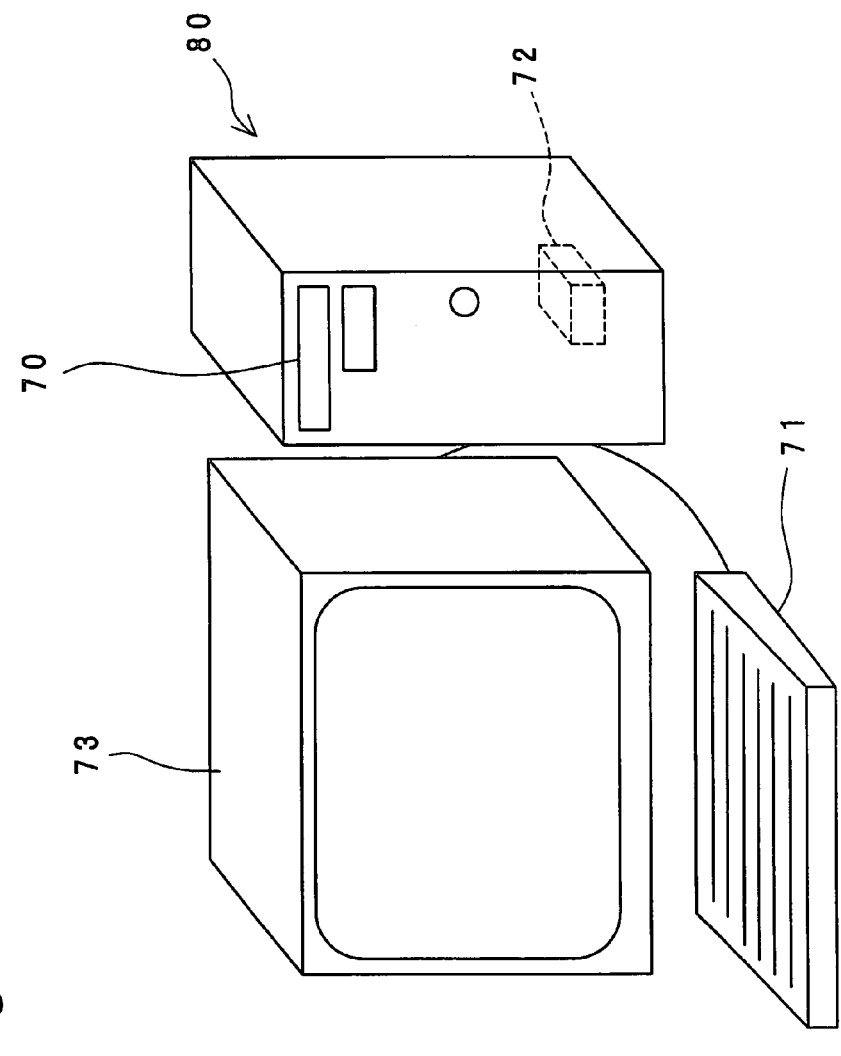
FIG. 8 is a schematic perspective view showing a configuration of a computer according to a fourth embodiment of the present invention, which includes the optical information apparatus of FIG. 7.

FIG. 8 shows a computer 80 according to a fourth embodiment of the present invention, which includes the optical information apparatus 70 of the third embodiment. In FIG. 8, the computer 80 includes the optical information apparatus 70 of the third embodiment, an input unit 71 for inputting information, for example, a keyboard, a mouse and a touch panel, an arithmetic unit 72 for performing arithmetic operation on the basis of the information inputted from the input unit 71 or information read out of the optical information apparatus 70, for example, a central processing unit (CPU) and an output unit 73 for displaying information on results of the arithmetic operation performed by the arithmetic unit 72, for example, a cathode-ray tube, a liquid crystal display (LCD) and a printer.

In the computer 80, the input unit 71 may also be formed by only an input terminal and the output unit 73 may also be formed by only an output terminal.

In the computer 80 of this embodiment, since the optical information apparatus 70 of the third embodiment is provided, recording and reproduction can be performed stably on a plurality of the optical discs of different kinds, so that the computer 80 has a wide range of uses.

FIFTH EMBODIMENT

Figure 9:
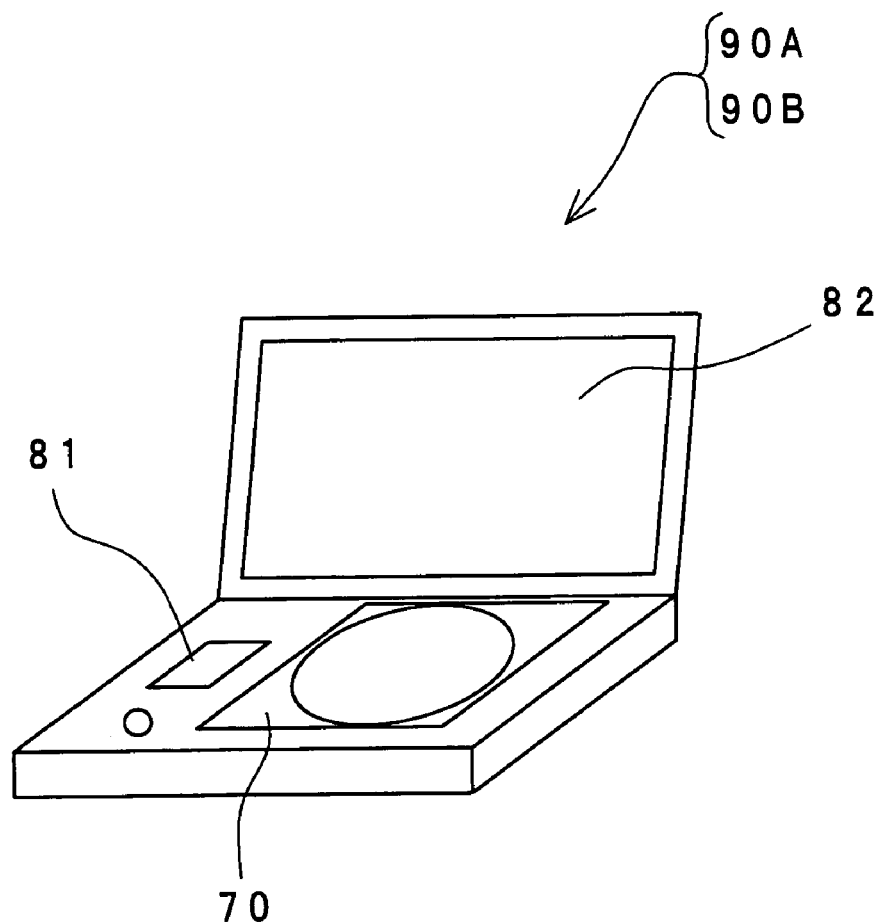
FIG. 9 is a schematic perspective view of an optical disc player and a car navigation system according to a fifth embodiment of the present invention, which include the optical information apparatus of FIG. 7.

FIG. 9 shows an optical disc player 90A according to a fifth embodiment of the present invention, which includes the optical information apparatus 70 of the third embodiment. In FIG. 9, the optical disc player 90A includes the optical information apparatus 70 of the third embodiment and a converter 81 for converting into an image an information signal obtained from the optical information apparatus 70, for example, a decoder. A liquid crystal monitor 82 may be further provided in the optical disc player 90A.

Meanwhile, this embodiment may also be applied to a car navigation system 90B as shown in FIG. 9.

In the optical disc player 90A and the car navigation system 90B of this embodiment, since the optical information apparatus 70 of the third embodiment is provided, recording and reproduction can be performed stably on a plurality of the optical discs of different kinds, so that the optical disc player 90A and the car navigation system 90B have a wide range of uses.

SIXTH EMBODIMENT

Figure 10:
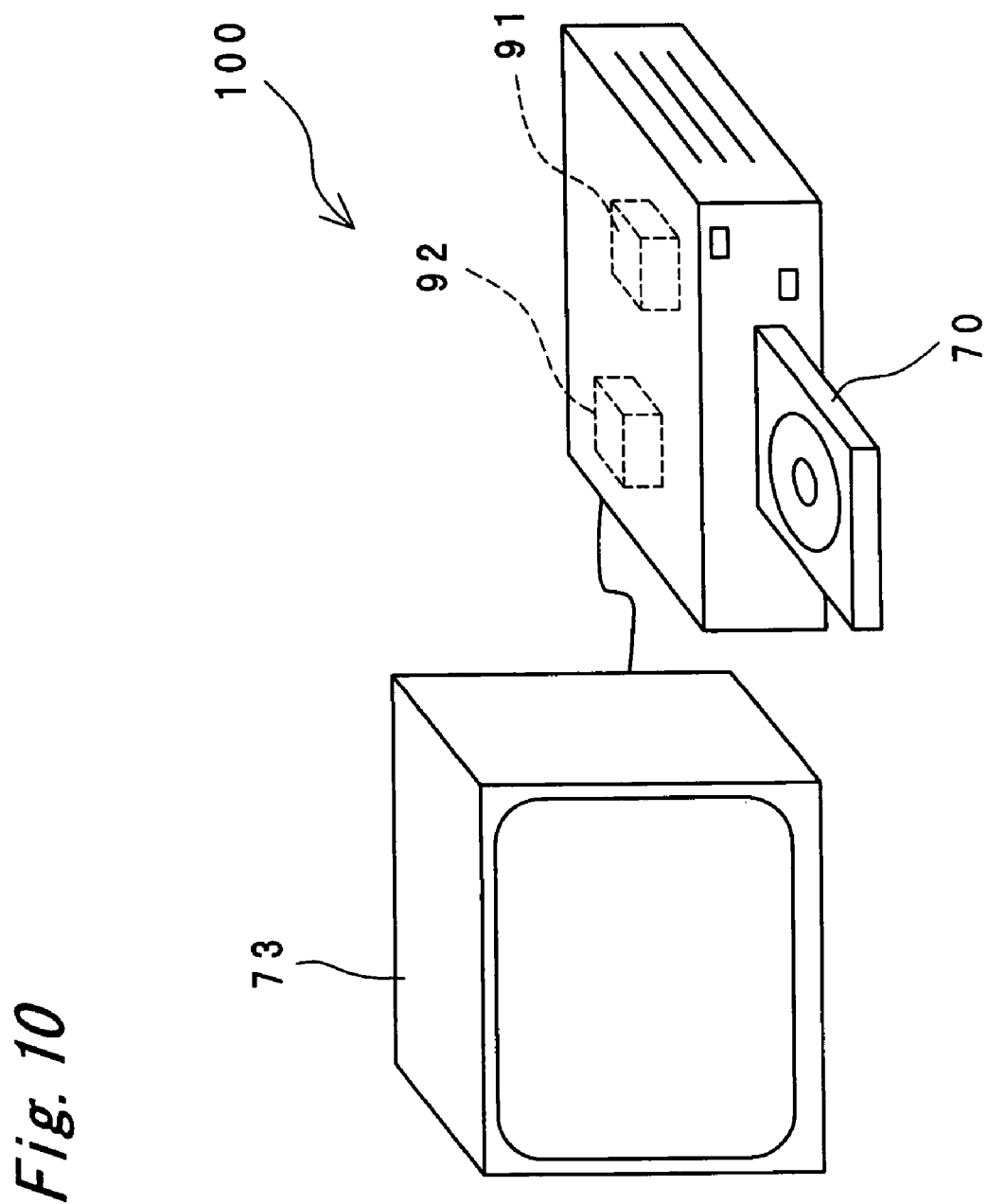
FIG. 10 is a schematic perspective view of an optical disc recorder according to a sixth embodiment of the present invention, which includes the optical information apparatus of FIG. 7.

FIG. 10 shows an optical disc recorder 100 according to a sixth embodiment of the present invention, which includes the optical information apparatus 70 of the third embodiment. In FIG. 10, the optical disc recorder 100 includes the optical information apparatus 70 of the third embodiment and a converter 91 for converting image information into information to be recorded on the optical disc 10 by the optical information apparatus 70, for example, an encoder. If a converter 92 for converting into an image an information signal obtained from the optical information apparatus 70, for example, a decoder is further provided, recorded portions can be reproduced. The output unit 73 for displaying information, for example, a cathode-ray tube, a liquid crystal display (LCD) and a printer may be further provided in the optical disc recorder 100 in the same manner as the fourth embodiment of FIG. 8.

In the optical disc recorder 100 of this embodiment, since the optical information apparatus 70 of the third embodiment is provided, recording and reproduction can be performed stably on a plurality of the optical discs of different kinds, so that the optical disc recorder 100 has a wide range of uses.

SEVENTH EMBODIMENT

Figure 11:
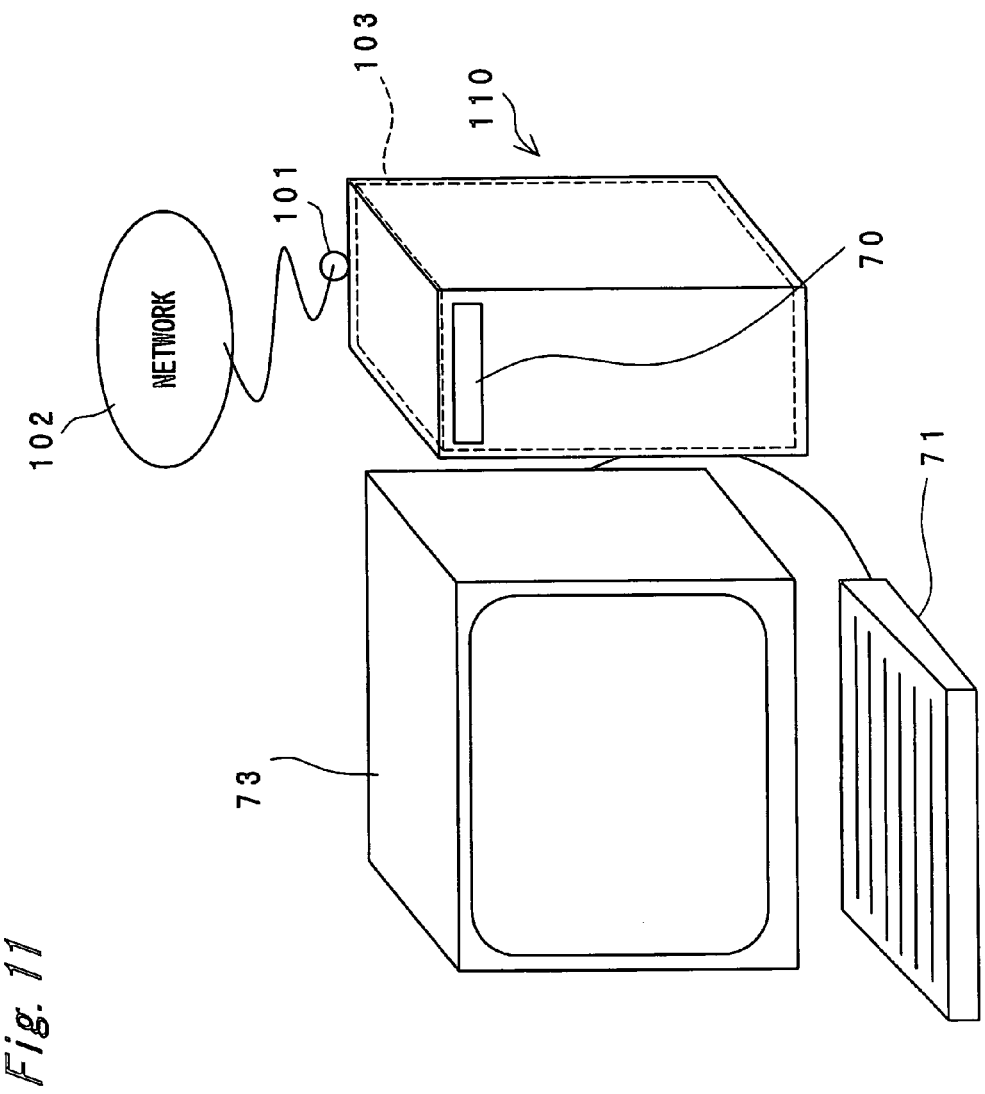
FIG. 11 is a schematic perspective view of an optical disc server according to a seventh embodiment of the present invention, which includes the optical information apparatus of FIG. 7.
Figure 12:
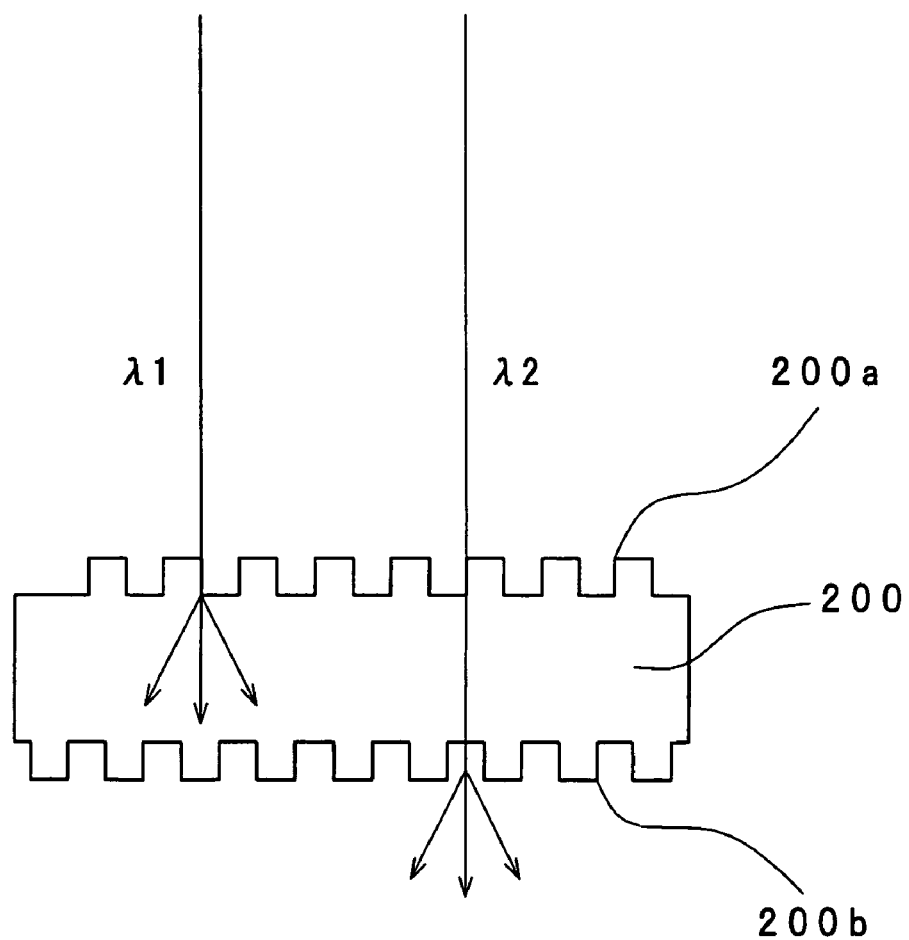
FIG. 12 is a schematic sectional view of a diffraction element employed in a prior art optical head device.

FIG. 11 shows an optical disc server 110 according to a seventh embodiment, which includes the optical information apparatus 70 of the third embodiment. In FIG. 11, the optical disc server 110 includes the optical information apparatus 70 of the third embodiment and a wired or wireless input/output terminal 101 for inputting to the optical information apparatus 70 information to be recorded by the optical information apparatus 70 or outputting to an external network 102 information read by the optical information apparatus 70.

The output unit 73 for displaying information, for example, a cathode-ray tube, a liquid crystal display (LCD) and a printer may be further provided in the same manner as the fourth embodiment of FIG. 8. In addition, if a changer 103 for loading and unloading a plurality of the optical discs into and from the optical information apparatus 70 is further provided in the optical disc server 110, such an effect is achieved that much information can be recorded and stored.

Meanwhile, since the optical disc server 110 exchanges information with the network 102, namely, a plurality of appliances such as a computer, a telephone set, a television tuner, etc., the optical disc server 100 can be used as a common information server for a plurality of the appliances.

In the optical disc server 110 of this embodiment, since the optical information apparatus 70 of the third embodiment is provided, recording and reproduction can be performed stably on a plurality of the optical discs of different kinds, so that the optical disc server 110 has a wide range of uses.

In the fourth to seventh embodiments, the output unit 73 is shown in FIGS. 8, 10 and 11 and the liquid crystal monitor 82 is shown in FIG. 9. However, it is needless to say that the output unit 73 or the liquid crystal monitor 82 may be replaced by an output terminal such that an output unit or a liquid crystal monitor commercially available separately is connected to the output terminal. Meanwhile, in FIGS. 9 and 10, the input unit is not illustrated, but an input unit such as a keyboard, a touch panel, a mouse, a remote control unit or the like may be provided. On the contrary, in the fourth to seventh embodiment, only an input terminal may be provided in place of the input unit 71 such that an input unit commercially available separately is connected to the input terminal.

Hereinafter, marked effects gained in the present invention are listed. First of all, the diffraction element of the present invention includes the light-transmittable member and the diffraction grating formed on at least one face of the light-transmittable member. When the first laser beam having the first wavelength λ1 and the second laser beam having the second wavelength λ2 are transmitted through the diffraction element, the first and second laser beams are turned into the first and second diffracted beams having the first and second diffraction efficiencies, respectively. The diffraction element functions to equalize the first and second diffraction efficiencies to each other by only the one face of the diffraction element. Meanwhile, the diffraction grating has the first phase modulation amount ø1 for the first laser beam and the second phase modulation amount ø2 for the second laser beam and the first and second phase modulation amounts ø1 and ø2 are, respectively, approximately expressed by the following equations (1) and (2):

$$ø1 = 2\pi N1 \pm \Delta ø \quad (1)$$

$$ø2 = 2\pi N2 \pm \Delta ø \quad (2)$$

in which "N1" and "N2" are natural numbers and "Δø" is a phase variation amount. Therefore, in the diffraction element, the diffraction efficiency of the first laser beam and that of the second laser beam can be made equal to each other by the diffraction grating formed on only the one face of the light-transmittable member. Therefore, in, for example, an optical pickup, since an optical system in which an identical quantity of light is obtained for the two wavelengths can be formulated, the single photodetector can be used for the two wavelengths, thereby resulting in reduction of the number of components.

Meanwhile, it is possible to gain such degree of freedom in which another function, for example, a three-beam grating for obtaining a tracking error signal may be provided on the other face of the light-transmittable member opposite to the one face having the diffraction grating, thereby resulting in further reduction of the number of components.

Meanwhile, in the diffraction element, the duty ratio of the diffraction grating is 0.5 generally. On the other hand, in the diffraction element of the present invention, since the duty ratio of the diffraction grating is other than 0.5, the diffraction efficiency can be adjusted.

In the diffraction element of the present invention, if the first laser beam is the blue laser beam having the wavelength of 380 to 420 nm as the first wavelength $\lambda 1$ and the second laser beam is the red laser beam having the wavelength of 630 to 680 nm as the second wavelength $\lambda 2$, the zero-order diffraction efficiency of the blue laser beam and that of the red laser beam can be adjusted so as to be substantially equal to each other and the first-order diffraction efficiency of the blue laser beam and that of the red laser beam can be adjusted so as to be substantially equal to each other.

In the diffraction element of the present invention, the depth of the groove portions of the diffraction grating is approximately expressed by the following equation (3):

$$h=[N\lambda 1\lambda 2/\{\lambda 1(n2-1)+\lambda 2(n1-1)\}] \quad (3)$$

in which "N" is the natural number, "n1" is the refractive index of the diffraction element for the first laser beam and "n2" is the refractive index of the diffraction element for the second laser beam, while the zero-order diffraction efficiency of the first laser beam and that of the second laser beam can be made substantially equal to each other and the first-order diffraction efficiency of the first laser beam and that of the second laser beam can be made substantially equal to each other. Therefore, in the diffraction element, the substantially equal diffraction efficiency for the first and second laser beams can be obtained by the diffraction grating formed on only the one face of the light-transmittable member.

In the diffraction element of the present invention, if the depth h1 of the diffraction grating is expressed by the following equation (4):

$$h1=[\lambda 1\lambda 2/\{\lambda 1(n2-1)+\lambda 2(n1-1)\}] \quad (4)$$

in which the natural number N is set to 1 in the equation (3) and the duty ratio is 0.135, the ratio of the zero-order diffraction efficiency to the first-order diffraction efficiency can be made approximate to (10/1).

In the diffraction element of the present invention, if the depth h2 of the diffraction grating is expressed by the following equation (5):

$$h2=[2\lambda 1\lambda 2/\{\lambda 1(n2-1)+\lambda 2(n1-1)\}] \quad (5)$$

in which the natural number N is set to 2 in the equation (3) and the duty ratio is 0.2, the ratio of the zero-order diffraction efficiency to the first-order diffraction efficiency can be made approximate to (10/1).

In the diffraction element of the present invention, if the depth h3 of the diffraction grating is expressed by the following equation (6):

$$h3=[3\lambda 1\lambda 2/\{\lambda 1(n2-1)+\lambda 2(n1-1)\}] \quad (6)$$

in which the natural number N is set to 3 in the equation (3) and the duty ratio is 0.5, the ratio of the zero-order diffraction efficiency to the first-order diffraction efficiency can be made approximate to (10/1). By employing such ratio of the zero-order diffraction efficiency to the first-order diffraction efficiency, influence of stray light which makes the output signal of the photodetector unstable can be neglected while the optical utilization efficiency is kept sufficiently high.

In the diffraction element of the present invention, if the diffraction grating is formed by the material having polarization anisotropy, presence and absence of diffraction can be detected based on polarization state, so that the diffraction element can be disposed also in the return optical path. Meanwhile, the diffraction element of the present invention can be formed by the isotropic material having no polarization anisotropy and thus, can be formed easily.

Furthermore, in the method of designing the diffraction grating formed on only the one face of the light-transmittable member in the diffraction element, according to the present invention, the first laser beam having the first wavelength $\lambda 1$ and the second laser beam having the second wavelength $\lambda 2$ are transmitted through the diffraction grating at the first and second diffraction efficiencies, respectively. The land portions each having the width Wa and the groove portions each having the width Wb and the depth h are alternately arranged in the diffraction grating and the duty ratio is defined as {Wa/(Wa+Wb)} such that the first and second diffraction efficiencies are adjusted by using the duty ratio and the depth h as parameters. Therefore, the zero-order diffraction efficiencies of the first and second laser beams and the first-order diffraction efficiencies of the first and second laser beams can be adjusted arbitrarily. Since the diffracted beam can be produced by the diffraction grating formed on only the one face of the light-transmittable member, the optical utilization efficiency can be made higher than that of a case in which diffraction efficiencies for the first and second laser beams are adjusted by two diffraction gratings formed on opposite faces of a diffraction element.

Meanwhile, it is possible to gain such degree of freedom in which another function, for example, a three-beam grating for obtaining a tracking error signal may be provided on the other face of the light-transmittable member opposite to the one face having the diffraction grating, thereby resulting in further reduction of the number of components.

In the method of the present invention, if the first laser beam is the blue laser beam having the wavelength of 380 to 420 nm as the first wavelength $\lambda 1$ and the second laser beam is the red laser beam having the wavelength of 630 to 680 nm as the second wavelength $\lambda 2$, the diffraction element can be used in the single optical system in which the ultrahigh-density optical disc under brisk research currently employs the blue laser beam as a light source and the DVD employs, for example, the red laser beam as the light source.

In the method of the present invention, the depth h of the groove portions of the diffraction grating is approximately expressed by the following equation (7):

$$h=[N\lambda 1\lambda 2/\{\lambda 1(n2-1)+\lambda 2(n1-1)\}] \quad (7)$$

in which "N" is the natural number, "n1" is the refractive index of the diffraction element for the first laser beam and "n2" is the refractive index of the diffraction element for the second laser beam, while the zero-order diffraction efficiency of the first laser beam and that of the second laser beam are made substantially equal to each other and the first-order diffraction efficiency of the first laser beam and that of the second laser beam are made substantially equal to each other. By this method, since the diffraction grating is designed such that an identical quantity of light can be obtained for the two wavelengths in, for example, an optical pickup, the single photodetector can be used for the two wavelengths, thereby resulting in the number of components.

In the method of the present invention, if the depth h1 of the diffraction grating is expressed by the following equation (8):

$$h1=[\lambda1\lambda2/\{\lambda1(n2-1)+\lambda2(n1-1)\}] \quad (8)$$

in which the natural number N is set to 1 in the equation (7) and the duty ratio is 0.135, design can be performed such that the ratio of the zero-order diffraction efficiency to the first-order diffraction efficiency is approximate to (10/1).

In the method of the present invention, if the depth h2 of the diffraction grating is expressed by the following equation (9):

$$h2=[2\lambda1\lambda2/\{\lambda1(n2-1)+\lambda2(n1-1)\}] \quad (9)$$

in which the natural number N is set to 2 in the equation (7) and the duty ratio is 0.2, design can be performed such that the ratio of the zero-order diffraction efficiency to the first-order diffraction efficiency is approximate to (10/1).

In the method of the present invention, if the depth h3 of the diffraction grating is expressed by the following equation (10):

$$h3=[3\lambda1\lambda2/\{\lambda1(n2-1)+\lambda2(n1-1)\}] \quad (10)$$

in which the natural number N is set to 3 in the equation (7) and the duty ratio is 0.5, design can be performed such that the ratio of the zero-order diffraction efficiency to the first-order diffraction efficiency is approximate to (10/1). By employing such design, the diffraction element can be designed such that influence of stray light which makes the output signal of the photodetector unstable can be neglected while the optical utilization efficiency is kept sufficiently high.

Moreover, the optical head device of the present invention includes the first laser beam source for emitting the blue laser beam having the first wavelength λ1, the second laser beam source for emitting the red laser beam having the second wavelength λ2, the optical lens for condensing at the minute spot on the information recording face of the optical information medium the blue laser beam or the red laser beam, the a photodetector for outputting, in response to the blue laser beam or the red laser beam reflected on the information recording face of the optical information medium, the electric signal corresponding to the quantity of the blue laser beam or the red laser beam and the above diffraction element. The optical head device of the present invention includes the above diffraction element as described above and therefore, is compact and inexpensive.

In addition, the optical information apparatus of the present invention includes the above optical head device, the motor for rotating the optical information medium and the electric circuit for controlling and driving, on the basis of the signal received from the optical head device, the motor or one of the optical lens, the first laser beam source and the second laser beam source of the optical head device. The optical information apparatus of the present invention includes the above optical head device as described above and therefore, is compact and inexpensive.

On the other hand, the computer of the present invention includes the above optical information apparatus, the input unit for inputting information, the arithmetic unit for performing arithmetic operation on the basis of the information inputted by the input unit or information reproduced from the optical information apparatus and the output unit for displaying or outputting the information inputted by the input unit, the information reproduced from the optical information apparatus or a result of the arithmetic operation of the arithmetic unit. The computer of the present invention includes the above optical information apparatus as described above and therefore, is compact and inexpensive.

Furthermore, the optical information medium player of the present invention includes the above optical information apparatus and the decoder for converting into the image the information signal obtained from the optical information apparatus. The optical information medium player of the present invention includes the above optical information apparatus as described above and therefore, is compact and inexpensive.

Likewise, the car navigation system of the present invention also includes the above optical information apparatus and the decoder for converting into the image the information signal obtained from the optical information apparatus. The car navigation system of the present invention includes the above optical information apparatus as described above and therefore, is compact and inexpensive.

Moreover, the optical information medium recorder of the present invention includes the above optical information apparatus and the encoder for converting the image information into the information to be recorded on the optical information medium by the optical information apparatus. The optical information medium recorder of the present invention includes the above optical information apparatus as described above and therefore, is compact and inexpensive.

In addition, the optical disc server of the present invention includes the above optical information apparatus and the input/output terminal for exchanging information with the external appliance. The optical disc server of the present invention includes the above optical information apparatus as described above and therefore, is compact and inexpensive.

The invention claimed is:

1. A diffraction element comprising:
   a light-transmittable member; and
   a diffraction grating which is formed on at least one face of the light-transmittable member;
   wherein when a first laser beam having a first wavelength λ1 and a second laser beam having a second wavelength λ2 are transmitted through the diffraction element, the diffraction element turns the first and second laser beams into first and second diffracted beams having first and second diffraction efficiencies, respectively;
   wherein the diffraction element functions to equalize the first and second diffraction efficiencies by only the one face of the diffraction element; and
   wherein the diffraction grating has a first phase modulation amount ø1 for the first laser beam and a second phase modulation amount ø2 for the second laser beam and the first and second phase modulation amounts ø1 and ø2 are, respectively, approximately expressed by the following equations (1) and (2):

$$ø1=2\pi N1 \pm \Delta ø \quad (1)$$

$$ø2=2\pi N2 \pm \Delta ø \quad (2)$$

in which "N1" and "N2" are natural numbers and "Δø" is a phase variation amount.

2. The diffraction element as claimed in claim 1, wherein the diffraction grating has a plurality of land portions each having a width Wa and a plurality of groove portions each having a width Wb alternately arranged therein and has a duty ratio defined as {Wa/(Wa+Wb)} so as to assume a value other than 0.5.

3. The diffraction element as claimed in claim 1, wherein the first laser beam is a blue laser beam having a wavelength of 380 to 420 nm as the first wavelength λ1 and the second laser beam is a red laser beam having a wavelength of 630 to 680 nm as the second wavelength λ2.

4. The diffraction element as claimed in claim 1, wherein the diffraction grating has a depth h approximately expressed by the following equation (3):

$$h=[N\lambda1\lambda2/\{\lambda1(n2-1)+\lambda2(n1-1)\}] \quad (3)$$

in which "N" is a natural number, "n1" is a refractive index of the diffraction element for the first laser beam and "n2" is a refractive index of the diffraction element for the second laser beam; and wherein a zero-order diffraction efficiency of the first laser beam and a zero-order diffraction efficiency of the second laser beam are approximately equal to each other and a first-order diffraction efficiency of the first laser beam and a first-order diffraction efficiency of the second laser beam are approximately equal to each other.

5. The diffraction element as claimed in claim 4, wherein the diffraction grating has a depth h1 expressed by the following equation (4):

$$h1=[\lambda1\lambda2/\{\lambda1(n2-1)+\lambda2(n1-1)\}] \quad (4)$$

in which the natural number N is set to 1 in the equation (3).

6. The diffraction element as claimed in claim 5, wherein the diffraction grating has a plurality of land portions each having a width Wa and a plurality of groove portions each having a width Wb alternately arranged therein and has a duty ratio defined as {Wa/(Wa+Wb)}; and wherein when the duty ratio is 0.135, a ratio of the zero-order diffraction efficiency to the first-order diffraction efficiency is approximate to (10/1).

7. The diffraction element as claimed in claim 4, wherein the diffraction grating has a depth h2 expressed by the following equation (5):

$$h2=[2\lambda1\lambda2/\{\lambda1(n2-1)+\lambda2(n1-1)\}] \quad (5)$$

in which the natural number N is set to 2 in the equation (3).

8. The diffraction element as claimed in claim 7, wherein the diffraction grating has a plurality of land portions each having a width Wa and a plurality of groove portions each having a width Wb alternately arranged therein and has a duty ratio defined as {Wa/(Wa+Wb)}; and wherein when the duty ratio is 0.2, a ratio of the zero-order diffraction efficiency to the first-order diffraction efficiency is approximate to (10/1).

9. The diffraction element as claimed in claim 4, wherein the diffraction grating has a depth h3 expressed by the following equation (6):

$$h3=[3\lambda1\lambda2/\{\lambda1(n2-1)+\lambda2(n1-1)\}] \quad (6)$$

in which the natural number N is set to 3 in the equation (3).

10. The diffraction element as claimed in claim 9, wherein the diffraction grating has a plurality of land portions each having a width Wa and a plurality of groove portions each having a width Wb alternately arranged therein and has a duty ratio defined as {Wa/(Wa+Wb)}; and wherein when the duty ratio is 0.5, a ratio of the zero-order diffraction efficiency to the first-order diffraction efficiency is approximate to (10/1).

11. The diffraction element as claimed in claim 1, wherein the diffraction grating is formed by material having polarization anisotropy.

12. The diffraction element as claimed in claim 1, wherein the diffraction grating is formed by isotropic material having no polarization anisotropy.

13. A method comprising designing a diffraction grating formed on only one face of a light-transmittable member in a diffraction element such that a first laser beam having a first wavelength λ1 and a second laser beam having a second wavelength λ2 are transmitted through the diffraction grating at first and second diffraction efficiencies, respectively;

wherein the diffraction grating has a plurality of land portions each having a width Wa and a plurality of groove portions each having a width Wb and a depth h alternately arranged therein and has a duty ratio defined as {Wa/(Wa+Wb)} such that the first and second diffraction efficiencies are adjusted by using the duty ratio and the depth h of the diffraction grating as parameters;

wherein the depth h of the diffraction grating is approximately expressed by the following equation (7):

$$h=[N\lambda1\lambda2/\{\lambda1(n2-1)+\lambda2(n1-1)\}] \quad (7)$$

in which "N" is a natural number, "n1" is a refractive index of the diffraction element for the first laser beam and "n2" is a refractive index of the diffraction element for the second laser beam; and wherein a zero-order diffraction efficiency of the first laser beam and a zero-order diffraction efficiency of the second laser beam are approximately equal to each other and a first-order diffraction efficiency of the first laser beam and a first-order diffraction efficiency of the second laser beam are approximately equal to each other.

14. The method as claimed in claim 13, wherein the diffraction grating has a depth h1 expressed by the following equation (8):

$$h1=[\lambda1\lambda2/\{\lambda1(n2-1)+\lambda2(n1-1)\}] \quad (8)$$

in which the natural number N is set to 1 in the equation (7).

15. The method as claimed in claim 14, wherein when the duty ratio is 0.135, a ratio of the zero-order diffraction efficiency to the first-order diffraction efficiency is approximate to (10/1).

16. The method as claimed in claim 13, wherein the diffraction grating has a depth h2 expressed by the following equation (9):

$$h2=[2\lambda1\lambda2/\{\lambda1(n2-1)+\lambda2(n1-1)\}] \quad (9)$$

in which the natural number N is set to 2 in the equation (7).

17. The method as claimed in claim 16, wherein when the duty ratio is 0.2, a ratio of the zero-order diffraction efficiency to the first-order diffraction efficiency is approximate to (10/1).

18. The method as claimed in claim 13, wherein the diffraction grating has a depth h3 expressed by the following equation (10):

$$h3=[3\lambda1\lambda2/\{\lambda1(n2-1)+\lambda2(n1-1)\}] \quad (10)$$

in which the natural number N is set to 3 in the equation (7).

19. The method as claimed in claim 18, wherein when the duty ratio is 0.5, a ratio of the zero-order diffraction efficiency to the first-order diffraction efficiency is approximate to (10/1).

20. An optical head device comprising:
a first laser beam source for emitting a blue laser beam having a first wavelength λ1;
a second laser beam source for emitting a red laser beam having a second wavelength λ2;
an optical lens for condensing the blue laser beam or the red laser beam at a minute spot on an information recording face of an optical information medium;
a photodetector for outputting, in response to the blue laser beam or the red laser beam reflected on the information recording face of the optical information medium, an electric signal corresponding to a quantity of the blue laser beam or the red laser beam; and
a diffraction element including a light-transmittable member and a diffraction grating formed on at least one face of the light-transmittable member;
wherein when the blue laser beam and the red laser beam are transmitted through the diffraction element, the diffraction element turns the blue laser beam and the red laser beam into first and second diffracted beams having first and second diffraction efficiencies, respectively;
wherein the diffraction element functions to equalize the first and second diffraction efficiencies by only the one face of the diffraction element;
wherein the diffraction grating has a first phase modulation amount ø1 for the blue laser beam and a second phase modulation amount ø2 for the red laser beam and the first and second phase modulation amounts ø1 and ø2 are, respectively, approximately expressed by the following equations (11) and (12):

$$ø1 = 2\pi N1 \pm \Delta ø \tag{11}$$

$$ø2 = 2\pi N2 \pm \Delta ø \tag{12}$$

in which "N1" and "N2" are natural numbers and "Δø" is a phase variation amount; and
wherein the photodetector receives the first or second diffracted beam so as to detect a servo signal.

21. An optical information apparatus comprising:
an optical head device which includes a first laser beam source for emitting a blue laser beam having a first wavelength λ1, a second laser beam source for emitting a red laser beam having a second wavelength λ2, an optical lens for condensing the blue laser beam or the red laser beam at a minute spot on an information recording face of an optical information medium, a photodetector for outputting, in response to the blue laser beam or the red laser beam reflected on the information recording face of the optical information medium, an electric signal corresponding to a quantity of the blue laser beam or the red laser beam, and a diffraction element having a light-transmittable member and a diffraction grating formed on at least one face of the light-transmittable member;
wherein when the blue laser beam and the red laser beam are transmitted through the diffraction element, the diffraction element turns the blue laser beam and the red laser beam into first and second diffracted beams having first and second diffraction efficiencies, respectively;
wherein the diffraction element functions to equalize the first and second diffraction efficiencies by only the one face of the diffraction element;
wherein the diffraction grating has a first phase modulation amount ø1 for the blue laser beam and a second phase modulation amount ø2 for the red laser beam and the first and second phase modulation amounts ø1 and ø2 are, respectively, approximately expressed by the following equations (11) and (12):

$$ø1 = 2\pi N1 \pm \Delta ø \tag{11}$$

$$ø2 = 2\pi N2 \pm \Delta ø \tag{12}$$

in which "N1" and "N2" are natural numbers and "Δø" is a phase variation amount;
wherein the photodetector receives the first or second diffracted beam so as to detect a servo signal;
a motor for rotating the optical information medium; and
an electric circuit for controlling and driving, on the basis of a signal received from the optical head device, the motor or one of the optical lens, the first laser beam source and the second laser beam source of the optical head device.

22. A computer comprising:
an optical information apparatus of claim 21;
an input unit for inputting information;
an arithmetic unit for performing arithmetic operation on the basis of the information inputted by the input unit or information reproduced from the optical information apparatus; and
an output unit for displaying or outputting the information inputted by the input unit, the information reproduced from the optical information apparatus or a result of the arithmetic operation of the arithmetic unit.

23. An optical information medium player comprising:
an optical information apparatus of claim 21; and
a decoder for converting an information signal obtained from the optical information apparatus into an image.

24. A car navigation system comprising:
an optical information apparatus of claim 21; and
a decoder for converting an information signal obtained from the optical information apparatus into an image.

25. An optical information medium recorder comprising:
an optical information apparatus of claim 21; and
an encoder for converting image information into information to be recorded on the optical information medium by the optical information apparatus.

26. An optical disc server comprising:
an optical information apparatus of claim 21; and
an input/output terminal for exchanging information with an external appliance.

* * * * *

UNITED STATES PATENT AND TRADEMARK OFFICE
CERTIFICATE OF CORRECTION

PATENT NO.         : 7,088,513 B2
APPLICATION NO.    : 10/823673
DATED              : August 8, 2006
INVENTOR(S)        : Toshiyasu Tanaka et al.

It is certified that error appears in the above-identified patent and that said Letters Patent is hereby corrected as shown below:

In column 19, line 13, please replace "$h = [N\lambda 1\lambda 2/\{\lambda 1(n2-1)+\lambda 2(n1-1)\}]$" with --$h = [N\lambda 1\lambda 2/\{\lambda 1(n2-1)+\lambda 2(n1-1)\}]$--.

In column 20, line 26, please replace "$h = [N\lambda 1\lambda 2/\{\lambda 1(n2-1)+\lambda 2(n1-1)\}]$" with --$h = [N\lambda 1\lambda 2/\{\lambda 1(n2-1)+\lambda 2(n1-1)\}]$--.

Signed and Sealed this

Thirteenth Day of February, 2007

JON W. DUDAS
*Director of the United States Patent and Trademark Office*